US012782372B2

(12) United States Patent
Hudak et al.

(10) Patent No.: US 12,782,372 B2
(45) Date of Patent: Nov. 3, 2026

(54) ROBOT TASK SCHEDULER WITH VERIFIED AUDIT TRAIL

(71) Applicant: Merck Sharp & Dohme LLC, Rahway, NJ (US)

(72) Inventors: Edward M. Hudak, Schwenksville, PA (US); Jason A. Cassaday, North Wales, PA (US); Brian Andrew Squadroni, Philidelphia, PA (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 336 days.

(21) Appl. No.: 18/491,327

(22) Filed: Oct. 20, 2023

(65) Prior Publication Data

US 2024/0133907 A1 Apr. 25, 2024
US 2024/0230692 A9 Jul. 11, 2024

Related U.S. Application Data

(60) Provisional application No. 63/418,438, filed on Oct. 21, 2022.

(51) Int. Cl.
*G01N 35/00* (2006.01)

(52) U.S. Cl.
CPC ... *G01N 35/00623* (2013.01); *G01N 35/0099* (2013.01); *G01N 2035/00633* (2013.01)

(58) Field of Classification Search
CPC ....... G01N 35/00069; G01N 35/00009; G01N 35/00; G01N 35/10; G01N 35/1065; G01N 35/02; G01N 35/00871; G01N 2400/00; G01N 2035/0091; G01N 35/00623; G01N 35/0099; G01N 2035/00801; G06Q 10/06; G06N 3/126; G06N 3/02; G06N 3/048; G06N 20/00; G05B 19/4183; G05B 19/41865; G06F 18/21; G06F 18/2178; G06F 17/18; G06V 10/82; G06V 10/7784; G06V 10/764; G06V 10/7715; G06V 20/176; G16H 40/67; G16H 40/63
USPC ........... 73/488, 490; 340/3.1, 2.1; 700/17, 2, 700/79; 702/121, 117, 116, 113, 188, 702/141, 150, 157, 158, 166, 108, 142,
(Continued)

(56) References Cited

U.S. PATENT DOCUMENTS 11,181,541 B2 * 11/2021 VanSickler ........ G01N 35/0092
2015/0242395 A1 * 8/2015 Hodak ............... G01N 35/0092 704/9

(Continued)

FOREIGN PATENT DOCUMENTS

CA 2635268 A1 * 2/2008 .............. B01L 3/021
WO WO-2022180487 A1 * 9/2022 ............. G06Q 10/20

*Primary Examiner* — Stephanie E Bloss
(74) *Attorney, Agent, or Firm* — Fenwick & West LLP

(57) ABSTRACT

A GUI is used to schedule a set of tasks for one or more robots to test samples using one or more instruments. A set of drivers are used to map instructions for the robots and instruments form a standardized format to a set of instrument/robot-specific formats. Using the standardized formats enables support for new types of robot and/or instrument to be easily added to the system. The robots and instruments generate test results from samples according to the instructions. Information about the testing may be stored in conjunction with user identifiers and other metadata to provide a verifiable audit trail across the instruments and robots.

20 Claims, 21 Drawing Sheets

(58) Field of Classification Search
USPC ............ 702/145, 151, 155, 182; 706/12, 15; 901/2, 41, 46
See application file for complete search history.

(56) References Cited

U.S. PATENT DOCUMENTS

| | | | | |
|---|---|---|---|---|
| 2019/0284579 | A1* | 9/2019 | Bernate | C12M 23/44 |
| 2022/0215948 | A1* | 7/2022 | Bardot | G16H 40/40 |
| 2023/0028638 | A1* | 1/2023 | Seawall | G06F 8/61 |

* cited by examiner

| | A | B | C | D |
|---|---|---|---|---|
| 1 | 222.2.2 | RU229910 | 20G1 | BC190F1 |
| 2 | 222.2.2 | RU229945 | 20G1 | BC190F1 |
| 3 | 222.2.2 | RU229947 | 20G2 | BC190F2 |
| 4 | 222.2.2 | RU229949 | 20G2 | BC190F2 |
| 5 | 222.2.2 | RU229951 | 20G3 | BC190F3 |
| 6 | 222.2.2 | RU229953 | 20G3 | BC190F3 |
| 7 | 222.2.2 | RU229955 | 30G1 | BC190F4 |
| 8 | 222.2.2 | RU229957 | 30G1 | BC190F4 |
| 9 | 222.2.2 | RU229959 | 30G2 | BC190F5 |
| 10 | 222.2.2 | RU229961 | 30G2 | BC190F5 |
| 11 | 222.2.2 | RU229963 | 30G3 | BC190F6 |
| 12 | 222.2.2 | RU229965 | 30G3 | BC190F6 |
| 13 | 222.2.2 | RU229967 | 41G1 | BC190F7 |
| 14 | 222.2.2 | RU229969 | 41G1 | BC190F7 |
| 15 | 222.2.2 | RU229971 | 41G2 | BC190F8 |
| 16 | 222.2.2 | RU229973 | 41G2 | BC190F8 |
| 17 | 222.2.2 | RU229975 | 41G3 | BC190F9 |

| | A | B | C | D | E | F | G |
|---|---|---|---|---|---|---|---|
| 1 | ProcRunID | UnitID | FuncUnitID | StepSeq | OpSeq | StepID | Operation |
| 2 | MultiTpd-CLA96-A12.csv-145816_20211018 | RU229910 | 1 | 38 | 4 | SUM 51TO 45- LICONIC45 IMPORT | SUM 51To 45- Liconic45 Import |
| 3 | MultiTpd-CLA96-A12.csv-145816_20211018 | RU229910 | 1 | 38 | 4 | SUM 51TO 45- LICONIC45 IMPORT | SUM 51To 45- Liconic45 Import |
| 4 | MultiTpd-CLA96-A12.csv-145816_20211018 | RU229910 | 1 | 38 | 3 | SUM 51TO 45- RBTMV33 51TO45 | SUM 51TO 45- RbtMv33 51To45 |
| 5 | MultiTpd-CLA96-A12.csv-145816_20211018 | RU229910 | 1 | 38 | 3 | SUM 51TO 45- RBTMV33 51TO45 | SUM 51TO 45- RbtMv33 51To45 |
| 6 | MultiTpd-CLA96-A12.csv-145816_20211018 | RU229910 | 1 | 38 | 2 | SUM 51TO 45- GETSTSCUR 51 | SUM 51To 45- GetStsCur 51 |
| 7 | MultiTpd-CLA96-A12.csv-145816_20211018 | RU229910 | 1 | 38 | 1 | SUM 51TO 45- GETSTSSDES 45 | SUM 51To 45- GetStsDes 45 |
| 8 | MultiTpd-CLA96-A12.csv-145816_20211018 | RU229910 | 1 | 37 | 1 | PHERASTARREAD OD450 | PheraStarRead OD450 |
| 9 | MultiTpd-CLA96-A12.csv-145816_20211018 | RU229910 | 1 | 37 | 1 | PHERASTARREAD OD450 | PheraStarRead OD450 |
| 10 | MultiTpd-CLA96-A12.csv-145816_20211018 | RU229910 | 1 | 36 | 3 | SUM 49TO 51- RBTMV33 49TO51 | SUM 49To 51- RbtMv33 49To51 |
| 11 | MultiTpd-CLA96-A12.csv-145816_20211018 | RU229910 | 1 | 36 | 3 | SUM 49TO 51- RBTMV33 49TO51 | SUM 49To 51- RbtMv33 49To51 |
| 12 | MultiTpd-CLA96-A12.csv-145816_20211018 | RU229910 | 1 | 36 | 2 | SUM 45TO 51- GETSTSCUR 49 | SUM 49To 51- GetStsCur 49 |
| 13 | MultiTpd-CLA96-A12.csv-145816_20211018 | RU229910 | 1 | 35 | 1 | SUM 45TO 51- GETSTSCUR 51 | SUM 45To 51- GetStsDes 51 |
| 14 | MultiTpd-CLA96-A12.csv-145816_20211018 | RU229910 | 1 | 34 | 1 | COM8149 STOP | Combi45 STOP |
| 15 | MultiTpd-CLA96-A12.csv-145816_20211018 | RU229910 | 1 | 34 | 5 | SUM 3TO 49- RBTMV33 HANDOFFTO 49 | SUM 3To 49- RbtMv33 HandOffTo 49 |
| 16 | MultiTpd-CLA96-A12.csv-145816_20211018 | RU229910 | 1 | 34 | 5 | SUM 3TO 49- HANDOFFPREP | SUM 3To 49- RbtMv33 HandOffTo 49 |
| 17 | MultiTpd-CLA96-A12.csv-145816_20211018 | RU229910 | 1 | 34 | 3 | SUM 3TO 49- GETSTSDES 49 | SUM 3To 49- RbtMv17 3ToHandOff |
| 18 | MultiTpd-CLA96-A12.csv-145816_20211018 | RU229910 | 1 | 34 | 3 | SUM 3TO 49-RBTMV17 3TOHANDOFF | SUM 3To 49- RbtMv17 3ToHandOff |
| 19 | MultiTpd-CLA96-A12.csv-145816_20211018 | RU229910 | 1 | 34 | 2 | SUM 3TO 49- HA | |
| 20 | MultiTpd-CLA96-A12.csv-145816_20211018 | RU229910 | 1 | 34 | 1 | SUM 3TO 49- GE | |
| 21 | MultiTpd-CLA96-A12.csv-145816_20211018 | RU229910 | 1 | 33 | 1 | INCUBATE 10MIN | |
| 22 | MultiTpd-CLA96-A12.csv-145816_20211018 | RU229910 | 1 | 32 | 3 | SUM 22TO 3- RB | |
| 24 | MultiTpd-CLA96-A12.csv-145816_20211018 | RU229910 | 1 | 32 | 3 | SUM 22TO 3- RB | |
| 25 | MultiTpd-CLA96-A12.csv-145816_20211018 | RU229910 | 1 | 32 | 2 | SUM 22TO 3- GE | |

MultiTpd-CLA96-A12.csv-145816_2

| H | I | J | K | L | M | N |
|---|---|---|---|---|---|---|
| Opinfo | StationID | IndexLocal | HR | MIN | SEC | CalcTime |
| UnitRelocate | 45 | 66 | 20 | 31 | 22 | 73882 |
| OpStart | 45 | 0 | 20 | 31 | 4 | 73864 |
| UnitRelocate: BarcodeVerified | 45 | 0 | 20 | 31 | 2 | 73862 |
| OpStart | 51 | 0 | 20 | 30 | 24 | 73824 |
| OpStart | 51 | 0 | 20 | 30 | 16 | 73816 |
| OpStart | 51 | 0 | 20 | 30 | 7 | 73807 |
| ReadComplete | 51 | 0 | 20 | 30 | 1 | 73801 |
| OpStart | 51 | 0 | 20 | 29 | 11 | 73751 |
| UnitRelocate: BarcodeVerified | 51 | 0 | 20 | 29 | 9 | 73749 |
| OpStart | 49 | 0 | 20 | 28 | 46 | 73726 |
| OpStart | 49 | 0 | 20 | 28 | 36 | 73716 |
| OpStart | 49 | 0 | 20 | 28 | 26 | 73706 |
| OpStart | 49 | 0 | 20 | 28 | 6 | 73686 |
| LidLoc:36-0; UnitRelocation; BarcodeVerified | 49 | 0 | 20 | 28 | 4 | 73684 |
| OpStart | 19 | 0 | 20 | 27 | 29 | 73649 |
| OpStart | 19 | 0 | 20 | 26 | 42 | 73602 |
| UnitRelocate: BarcodeVerified | 19 | 0 | 20 | 26 | 40 | 73600 |
| OpStart | 3 | 0 | 20 | 26 | 14 | 73574 |
| OpStart | 3 | 0 | 20 | 25 | 29 | 73529 |
| OpStart | 3 | 0 | 20 | 25 | 19 | 73519 |
| OpStart | 3 | 0 | 20 | 15 | 16 | 72916 |
| UnitRelocate: BarcodeVerified | 3 | 0 | 20 | 15 | 13 | 72913 |
| OpStart | 22 | 0 | 20 | 14 | 36 | 72876 |
| OpStart | 22 | 0 | 20 | 14 | 27 | 72867 |

FIG. 7

Plate Barcode

Station ID

Unit (Row) Index location at that station

Lid Status

| | A | B | C | |
|---|---|---|---|---|
| 7 | CB000349 | 3 | 0 | T |
| 8 | CB000350 | 3 | 1 | T |
| 9 | CB000351 | 3 | 2 | T |
| 10 | CB000352 | 3 | 3 | T |
| 11 | CB000353 | 3 | 4 | T |
| 12 | CB000354 | 3 | 5 | T |
| 13 | CB000355 | 3 | 6 | T |
| 14 | CB000356 | 3 | 7 | T |
| 15 | CB000357 | 3 | 8 | T |
| 16 | CB000358 | 3 | 9 | T |
| 17 | CB000359 | 3 | 10 | T |
| 18 | CB000360 | 3 | 11 | T |
| 19 | CB000361 | 3 | 12 | T |
| 20 | CB000362 | 3 | 13 | T |
| 21 | CB000341 | 3 | 14 | T |
| 22 | S0000003 | 5 | 0 | T |
| 23 | CB000343 | 5 | 1 | T |
| 24 | CB000344 | 5 | 2 | T |

TeliosSystemInventory

FIG. 10

| | A | B | C | D | E | F | G |
|---|---|---|---|---|---|---|---|
| 1 | CB000349 | 0 | 1 | 1 | Present | TRUE | TRUE |
| 2 | CB000350 | 1 | 1 | 1 | Present | TRUE | TRUE |
| 3 | CB000351 | 2 | 1 | 3 | Present | TRUE | TRUE |
| 4 | CB000352 | 3 | 1 | 4 | Present | TRUE | TRUE |
| 5 | CB000353 | 4 | 1 | 5 | Present | TRUE | TRUE |
| 6 | CB000354 | 5 | 1 | 6 | Present | TRUE | TRUE |
| 7 | CB000355 | 6 | 1 | 7 | Present | TRUE | TRUE |
| 8 | CB000356 | 7 | 1 | 8 | Present | TRUE | TRUE |
| 9 | CB000357 | 8 | 1 | 9 | Present | TRUE | TRUE |
| 10 | CB000358 | 9 | 1 | 10 | Present | TRUE | TRUE |
| 11 | CB000359 | 10 | 1 | 11 | Present | TRUE | TRUE |
| 12 | CB000360 | 11 | 1 | 12 | Present | TRUE | TRUE |
| 13 | CB000361 | 12 | 1 | 13 | Present | TRUE | TRUE |
| 14 | CB000362 | 13 | 1 | 14 | Present | TRUE | TRUE |
| 15 | CB000341 | 14 | 1 | 15 | Present | FALSE | TRUE |
| 16 | | 15 | 1 | 16 | Empty | FALSE | FALSE |
| 17 | | 16 | 1 | 17 | Empty | FALSE | FALSE |
| 18 | | 17 | 1 | 18 | Empty | FALSE | FALSE |

◀ ▶ DrvInvStation3 (+)

FIG. 11

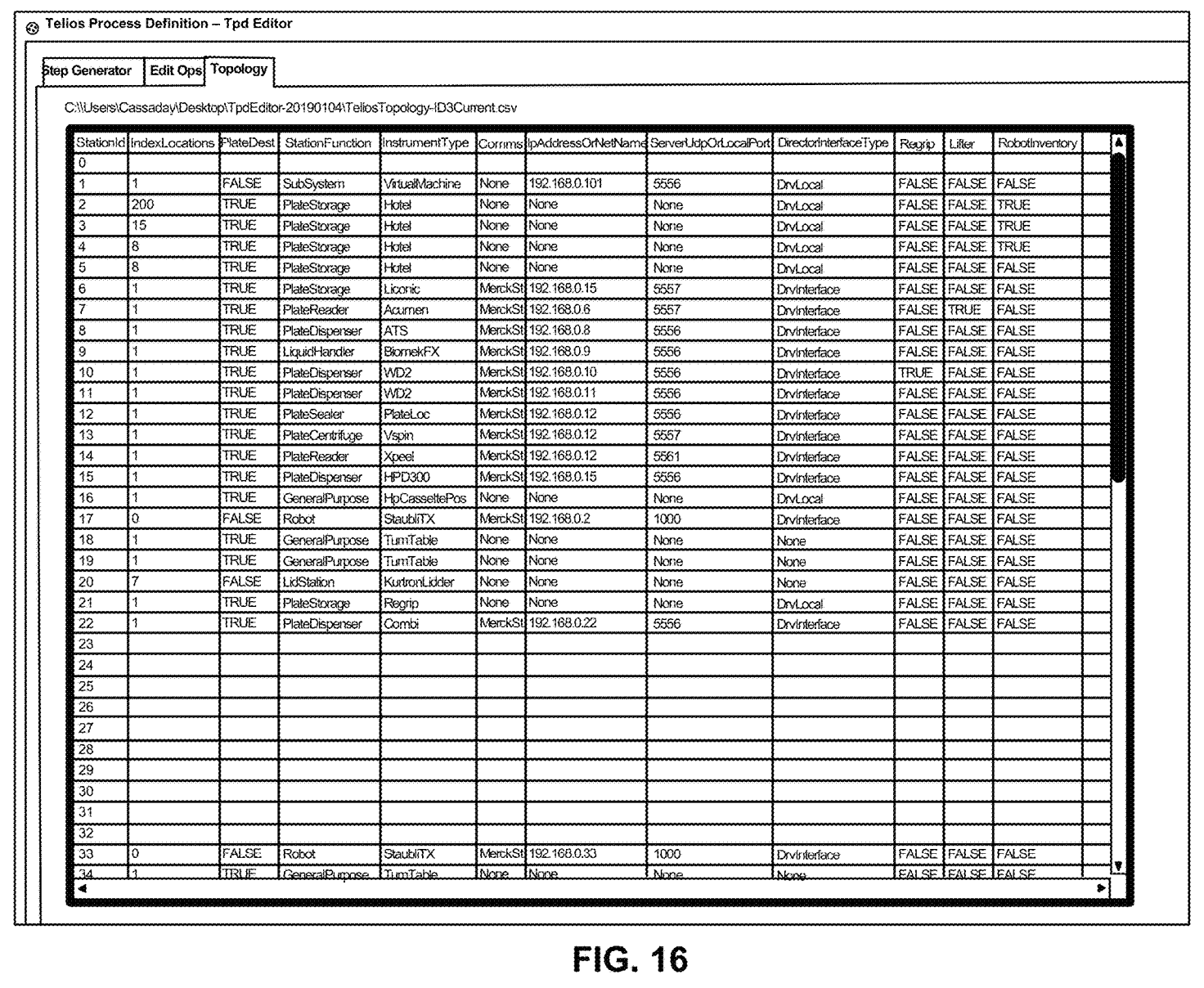

Telios Process Definition – Tpd Editor

Step Generator | Edit Ops | Topology

C:\\Users\Cassaday\Desktop\TpdEditor-20190104\TeliosTopology-ID3Current.csv

| StationId | IndexLocations | PlateDest | StationFunction | InstrumentType | Comms | IpAddressOrNetName | ServerUdpOrLocalPort | DirectorInterfaceType | Regrip | Lifter | RobotInventory |
|---|---|---|---|---|---|---|---|---|---|---|---|
| 0 | | | | | | | | | | | |
| 1 | 1 | FALSE | SubSystem | VirtualMachine | None | 192.168.0.101 | 5556 | DrvLocal | FALSE | FALSE | FALSE |
| 2 | 200 | TRUE | PlateStorage | Hotel | None | None | None | DrvLocal | FALSE | FALSE | TRUE |
| 3 | 15 | TRUE | PlateStorage | Hotel | None | None | None | DrvLocal | FALSE | FALSE | TRUE |
| 4 | 8 | TRUE | PlateStorage | Hotel | None | None | None | DrvLocal | FALSE | FALSE | TRUE |
| 5 | 8 | TRUE | PlateStorage | Hotel | None | None | None | DrvLocal | FALSE | FALSE | FALSE |
| 6 | 1 | TRUE | PlateStorage | Liconic | MerckSt | 192.168.0.15 | 5557 | DrvInterface | FALSE | FALSE | FALSE |
| 7 | 1 | TRUE | PlateReader | Acumen | MerckSt | 192.168.0.6 | 5557 | DrvInterface | FALSE | TRUE | FALSE |
| 8 | 1 | TRUE | PlateDispenser | ATS | MerckSt | 192.168.0.8 | 5556 | DrvInterface | FALSE | FALSE | FALSE |
| 9 | 1 | TRUE | LiquidHandler | BiomekFX | MerckSt | 192.168.0.9 | 5556 | DrvInterface | FALSE | FALSE | FALSE |
| 10 | 1 | TRUE | PlateDispenser | WD2 | MerckSt | 192.168.0.10 | 5556 | DrvInterface | TRUE | FALSE | FALSE |
| 11 | 1 | TRUE | PlateDispenser | WD2 | MerckSt | 192.168.0.11 | 5556 | DrvInterface | FALSE | FALSE | FALSE |
| 12 | 1 | TRUE | PlateSealer | PlateLoc | MerckSt | 192.168.0.12 | 5556 | DrvInterface | FALSE | FALSE | FALSE |
| 13 | 1 | TRUE | PlateCentrifuge | Vspin | MerckSt | 192.168.0.12 | 5557 | DrvInterface | FALSE | FALSE | FALSE |
| 14 | 1 | TRUE | PlateReader | Xpeel | MerckSt | 192.168.0.12 | 5561 | DrvInterface | FALSE | FALSE | FALSE |
| 15 | 1 | TRUE | PlateDispenser | HPD300 | MerckSt | 192.168.0.15 | 5556 | DrvInterface | FALSE | FALSE | FALSE |
| 16 | 1 | TRUE | GeneralPurpose | HpCassettePos | None | None | None | DrvLocal | FALSE | FALSE | FALSE |
| 17 | 0 | FALSE | Robot | StaubliTX | MerckSt | 192.168.0.2 | 1000 | DrvInterface | FALSE | FALSE | FALSE |
| 18 | 1 | TRUE | GeneralPurpose | TurnTable | None | None | None | None | FALSE | FALSE | FALSE |
| 19 | 1 | TRUE | GeneralPurpose | TurnTable | None | None | None | None | FALSE | FALSE | FALSE |
| 20 | 7 | FALSE | LidStation | KurtronLidder | None | None | None | None | FALSE | FALSE | FALSE |
| 21 | 1 | TRUE | PlateStorage | Regrip | None | None | None | DrvLocal | FALSE | FALSE | FALSE |
| 22 | 1 | TRUE | PlateDispenser | Combi | MerckSt | 192.168.0.22 | 5556 | DrvInterface | FALSE | FALSE | FALSE |
| 23 | | | | | | | | | | | |
| 24 | | | | | | | | | | | |
| 25 | | | | | | | | | | | |
| 26 | | | | | | | | | | | |
| 27 | | | | | | | | | | | |
| 28 | | | | | | | | | | | |
| 29 | | | | | | | | | | | |
| 30 | | | | | | | | | | | |
| 31 | | | | | | | | | | | |
| 32 | | | | | | | | | | | |
| 33 | 0 | FALSE | Robot | StaubliTX | MerckSt | 192.168.0.33 | 1000 | DrvInterface | FALSE | FALSE | FALSE |
| 34 | 1 | TRUE | GeneralPurpose | TurnTable | None | None | None | None | FALSE | FALSE | FALSE |

FIG. 16

ROBOT TASK SCHEDULER WITH VERIFIED AUDIT TRAIL

BACKGROUND

1. Technical Field

The subject matter described relates generally to laboratory automation and, in particular, to a robot task scheduler.

2. Background Information

Modern laboratories include many different computer-based instruments. Many experimental tasks (e.g., assays) involve the use of multiple instruments with one or more robots transferring a sample from instrument to instrument. Coordinating such tasks between instruments is typically challenging because each uses its own data formats and protocols. In many cases, the instruments are made by different manufacturers and have no built-in functions for interoperability. There is this a need for a system that can coordinate the operation of multiple robots and instruments regardless of the underlying protocols and data formats used by each.

BRIEF DESCRIPTION OF THE DRAWINGS

FIG. 7 illustrates a portion of a run summary file, according to one embodiment.

FIG. 10 illustrates a portion of an example Director Inventory file, according to one embodiment.

FIG. 11 illustrates a portion of an example Driver Inventory file, according to one embodiment.

FIG. 16 illustrates an example view of the system topology in the user interface, according to one embodiment.

DETAILED DESCRIPTION

The figures and the following description describe certain embodiments by way of illustration only. One skilled in the art will readily recognize from the following description that alternative embodimenhere ts of the structures and methods may be employed without departing from the principles described. Wherever practicable, similar or like reference numbers are used in the figures to indicate similar or like functionality. Where elements share a common numeral followed by a different letter, this indicates the elements are similar or identical. A reference to the numeral alone generally refers to any one or any combination of such elements, unless the context indicates otherwise.

OVERVIEW

A GUI is used to schedule a set of tasks for one or more robots, such as testing samples as part of a clinical trial using one or more instruments. Instructions to complete the tasks are sent to the robots and/or instruments using dedicated drivers that represent tasks in a standardized format. The instructions sent, any responses received, and the results generated may be processed (e.g., for quality control) and stored in a standardized format to enable further analysis and complete auditing in compliance with regulatory requirements. Using standardized formats enables support for new types of robot and/or instrument to be easily added to the system. A driver that maps the protocols and data structures used by the new robot or instrument to the standardized format can be defined. Thus, from the system's perspective, once a driver is provided, the instruments and robots all appear to use the same data format and protocol. A set of one or more robots and one or more instruments may collectively be referred to as a set of devices.

EXAMPLE SYSTEMS

Figure 1:
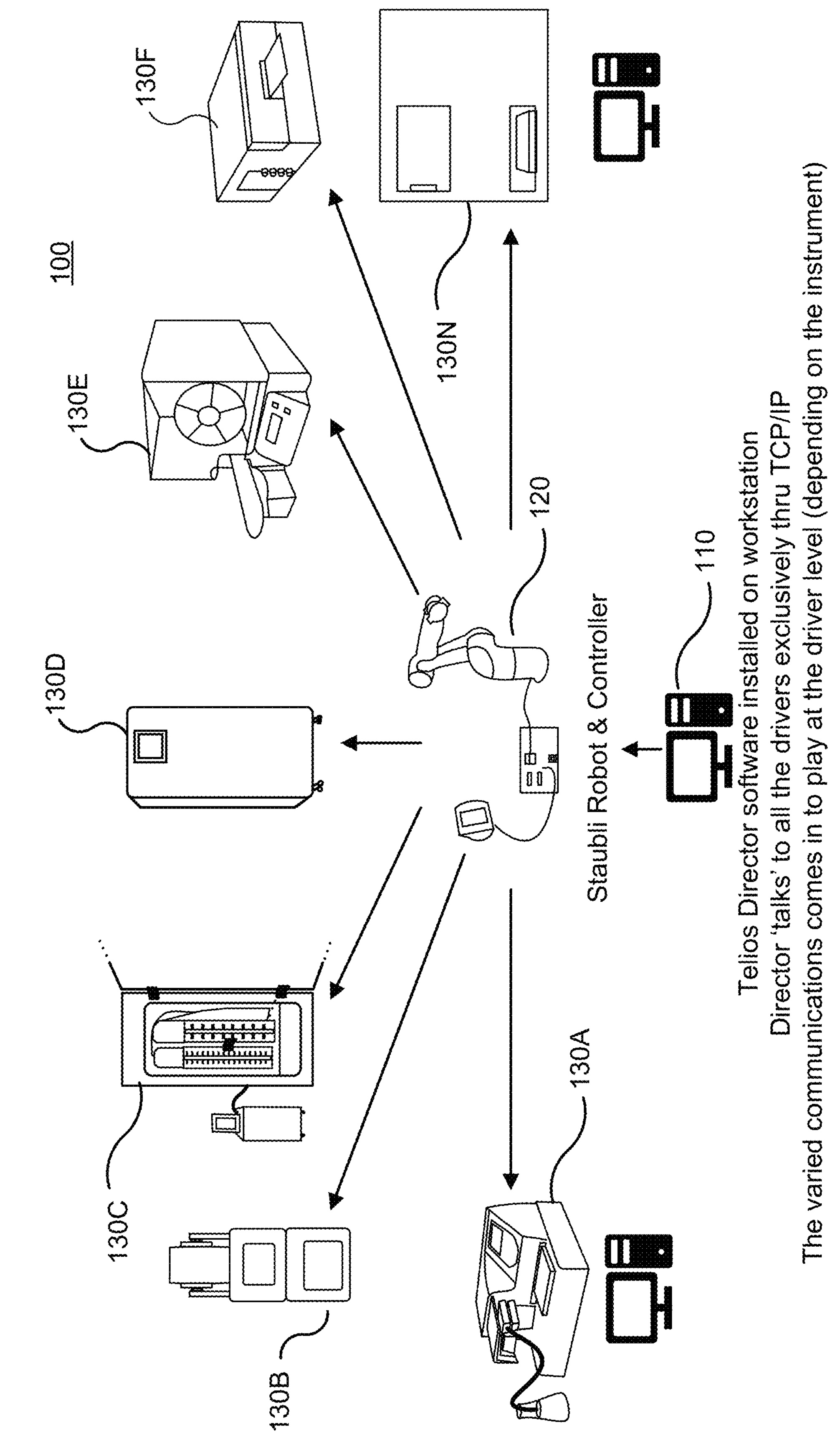
FIG. 1 is a block diagram of a networked computing environment in which one or more robots interacts with multiple instruments, according to one embodiment.

FIG. 1 illustrates one embodiment of a networked computing environment 100 suitable for automated task management. In the embodiment shown, the networked computing environment 100 includes a workstation 110, a robot/controller 120, and a set of instruments 130A though 130N. In other embodiments, the networked computing environment 100 includes different and/or additional elements. In addition, the functions may be distributed among the elements in a different manner than described.

The workstation 110 includes one or more computing devices that enable a user to schedule tasks (e.g., using a graphical user interface (GUI)). The workstation generates instructions for implementing the tasks by the robot 120 and/or one or more instruments 130 in a standardized format. Various embodiments of the workstation are described in greater detail below, with reference to FIG. 1.

The robot/controller 120 is a robotic system that can interact with the instruments 130 to perform scheduled tasks. For example, the robot/controller 120 can implement instructions received from the workstation to move a sample from a storage area to a first instrument 130A for a first step in an assay and then move the sample to a second instrument 130B for a second step of the assay, etc. Using the instructions issued by the workstations 110, the robot/controller 120 may implement highly complex workflows using unconventional format and perform fully automated cross-titration experiments.

The instruments 130 are devices that perform tests or other operations on samples. The instruments 130 may be provided by different manufacturers and use different protocols and/or data formats. The instruments 130 may receive instructions directly from the workstation 110 and/or via the robot/controller 120 to perform operations. Each instrument 130 receives instructions in its own format that have been mapped from the standardized format used by the workstation using a driver. Similarly, the data generated by the instrument in its own format may be provided to the workstation 110 which maps it into a standardized storage format for further analysis.

Figure 2:
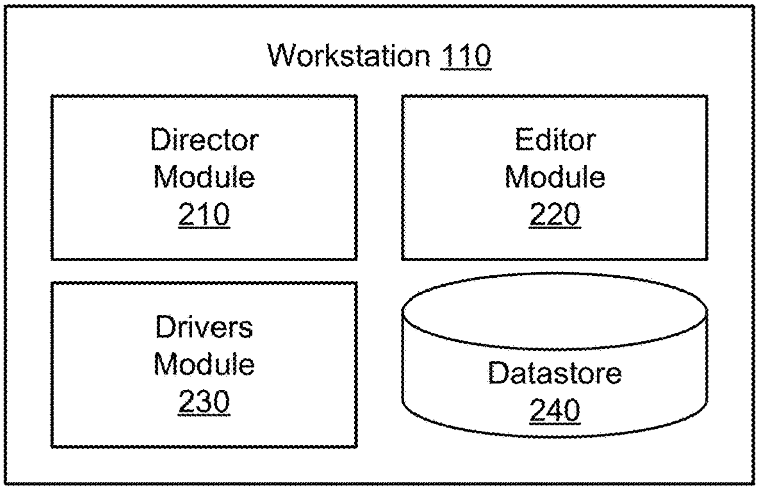
FIG. 2 is a block diagram of the workstation shown in FIG. 1, according to one embodiment.

The components of the networked computing environment 100 communicate via one or more networks. The network(s) can include any combination of local area and wide area networks, using wired or wireless communication systems. In one embodiment, a network uses standard communications technologies and protocols. For example, the network can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, some or all of the communication links of the network 170 may be encrypted using any suitable technique or techniques. FIG. 2 illustrates one embodiment of the workstation 110. In the embodiment shown, the workstation 110 includes a director module 210, an editor module 220, a drivers module 230, and a datastore 240. In other embodiments, the workstation 110 includes different and/or additional elements. In addition, the functions may be distributed among the elements in a different manner than described.

The director module 210 links instruments such as robotic arms and surrounding peripherals. In one embodiment, the director module 210 provides a multistep high-throughput screening platform. The director module 210 provides for display a user interface (e.g., a GUI) that enables an operator to update the system inventory, load processes, and control integrated drivers. The director module 210 may support multiple simultaneous processes across as series of units, and information transfer between units. The director module 210 may maintain an inventory of the plates that exist within the system. As plates are processed at various stations within the automation platform, director module 210 can associate or retrieve relevant information (e.g. file paths, clusters of data) to or from any plate in the inventory. This information can then serve as an input for downstream instrument functions, which are configured to make use of or further process the retrieved information. This can enable dynamic behavior of the system, such as on-the-fly decision making, data consolidation, image analysis, and calculations.

The editor module 220 provides a user interface (e.g., a GUI) with which the operator can create multistep protocols for multiple instruments and/or robots. For example the user interface may enable the user to define how instructions in the standardized format used by the director module 210 map to instructions in the native protocol or language used by a new type of instrument or robot that is being added to the environment 100. In one embodiment, the robots and instruments are integrated into the platform by defining drivers and positioning them in the system topology. Protocols created using the editor module 220 can be executed by the director module 210 for automatic, multistep use of multiple robots and/or instruments.

The drivers module 230 manages drivers within the system. A driver can enable one the workstation 110 to communicate with a specific instrument or robot by providing a mapping between a standardized format used by the director module 210 and the specific protocols and/or data formats used by the instrument or robot. By mapping drivers to the standardized format, the drivers module 230 enables the director module 210 to easily aggregate data from multiple sources. The director module 210 can define a set of operations in the unified language, distribute those instructions to the relevant robots or instruments (with the instructions being translated into the appropriate format for each end point by the corresponding drivers), and receive results data back in a standardized format (having been converted as needed from a native data format to the standardized format by the corresponding drivers).

The datastore 240 includes one or more computer-readable media that store the data used by the workstation. For example, the drivers used by the driver module 230 may be stored in the datastore 240. The data received from instruments may also be stored in the datastore 240. Although the datastore 240 is shown as a single entity within the workstation, the data stored may be distributed among multiple such datastores in one or more locations. For example, instrument data may be stored in a distributed database along with metadata providing context for what the data is (e.g., date and time collected, instrument or instruments used, assay performed, subject ID, etc.) accessed via the network 170.

Figure 3:
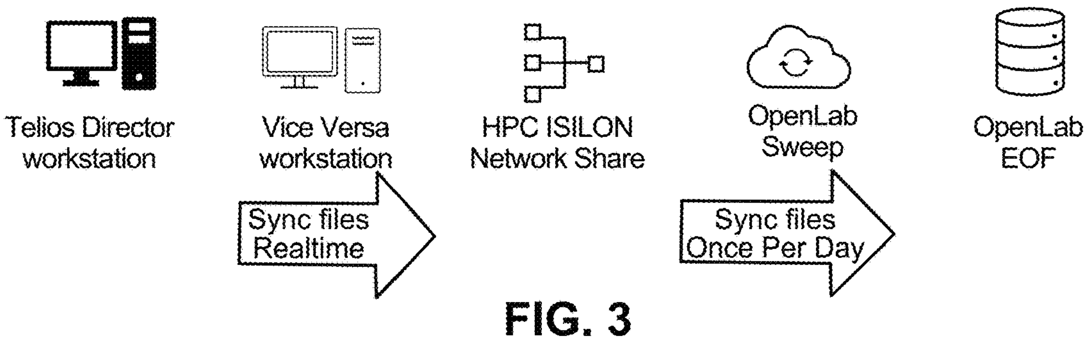
FIG. 3 illustrates a file synchronization that transfers instrumented-generated raw data to a secure network drive, according to one embodiment.

FIG. 3 illustrates one embodiment of a file synchronization process that transfers instrumented-generated raw data to a secure network drive. In the embodiment shown, the file synchronization service automatically transfers instrument generated raw data files and log files from a source directory on an instrument workstation to a secure network drive. This sweep may occur as soon as the new file is detected, periodically, or in response to a trigger (e.g., a user request). A checksum may be performed at the end of the data transfer to ensure that transfer completed successfully. If a transaction did not successfully transfer all files due to an interruption in the upload, the transfer may be re-initiated so that the remaining files are uploaded (to ensure no data loss in transfer). An alert notification may be sent in an email to a user, admin, or a distribution list if there is a failure in the upload. A mechanism to automatically upload instrument generated raw data files and log files from this secure network drive to long term storage may occur periodically (e.g., once per day at a defined time) or in response to a trigger (e.g., a user request or a certain amount of data having been aggregated since a previous upload to long term storage).

In one embodiment, the automatic transfer of data includes dedicated “Data” and “Trace” folders on the workstation 110. Folder replication software may be used to look for newly generated files and replicate any such files to an HPC share. The process may check for new files every minute to minimize the risk of data loss or modification. This transfer is performed by a dedicated service account which has at least read access to the source location and write access to the target location. There may be a staging area on the HPC share for storing files that are generated each day. OpenLab sweep may be used to transfer files from the staging area to the secure repository, and then delete the copy in the staging area. Official source files may be in OpenLab for long-term storage. When a process is started, the director module 210 may create copies of the following: Topology File, Process Inventory File, and a TPDEditor report xml file; the names of these files will all have the lead in of ProcRunID (TeliosTopology (.csv), Inventory (.csv), TPDReport (.xml). All these files are deposited in Trace for the sweep.

For source locations, the raw data file may be stored into the following folder structure for each instrument: . . . \Telios\<SYSTEM NAME>\Data\ . . . . The trace file may be stored into the following folder structure for each instrument: . . . \Telios<SYSTEM NAME>\Trace\ . . . .

For the staging area, the system may store raw data in a network drive within the following folder structure: \\<SHARE>\<SYSTEM NAME>\Data\ . . . . The system may store the trace file in the network drive within the following folder structure: \\<SHARE>\<SYSTEM NAME>\Trace\ . . . .

For long term storage, the system may store raw data in Openlab within the following folder structure: \<DEPT>\<SYSTEM NAME>\Data\ . . . . The system may store trace file in Openlab within the following folder structure: \<DEPT>\<SYSTEM NAME>\Trace\ . . . .

Figure 4:
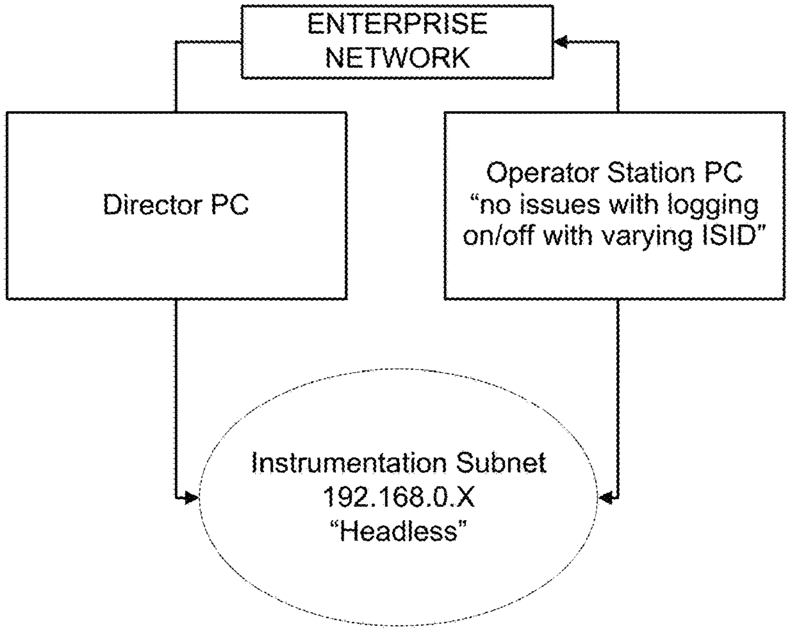
FIG. 4 illustrates the use of multiple computers to provide security and an audit trail, according to one embodiment.

FIG. 4 illustrates the use of multiple computers to provide security and an audit trail, according to one embodiment. Both the Telios Director and drivers have the user authenticate with a set of credentials (e.g., a username and password) that includes a unique identification of the user (referred to as a userID). A trace file is generated that records the users' userID for each operation. As shown in FIG. 4, separate computers may be used for the director and for operation of instruments. Each can have its own permission and trace configurations. This automated generation of trace files may provide a verifiable audit trail that is not reliant on any human intervention or action. Thus, in contrast to conventional systems. No trust in the human operators is required for auditing. This can be particularly valuable in heavily regulated environments, such as performing clinical trials or conducting medical tests as being able to provide a clear and verified audit trail can be used to prove compliance with any relevant regulations.

Figure 5:
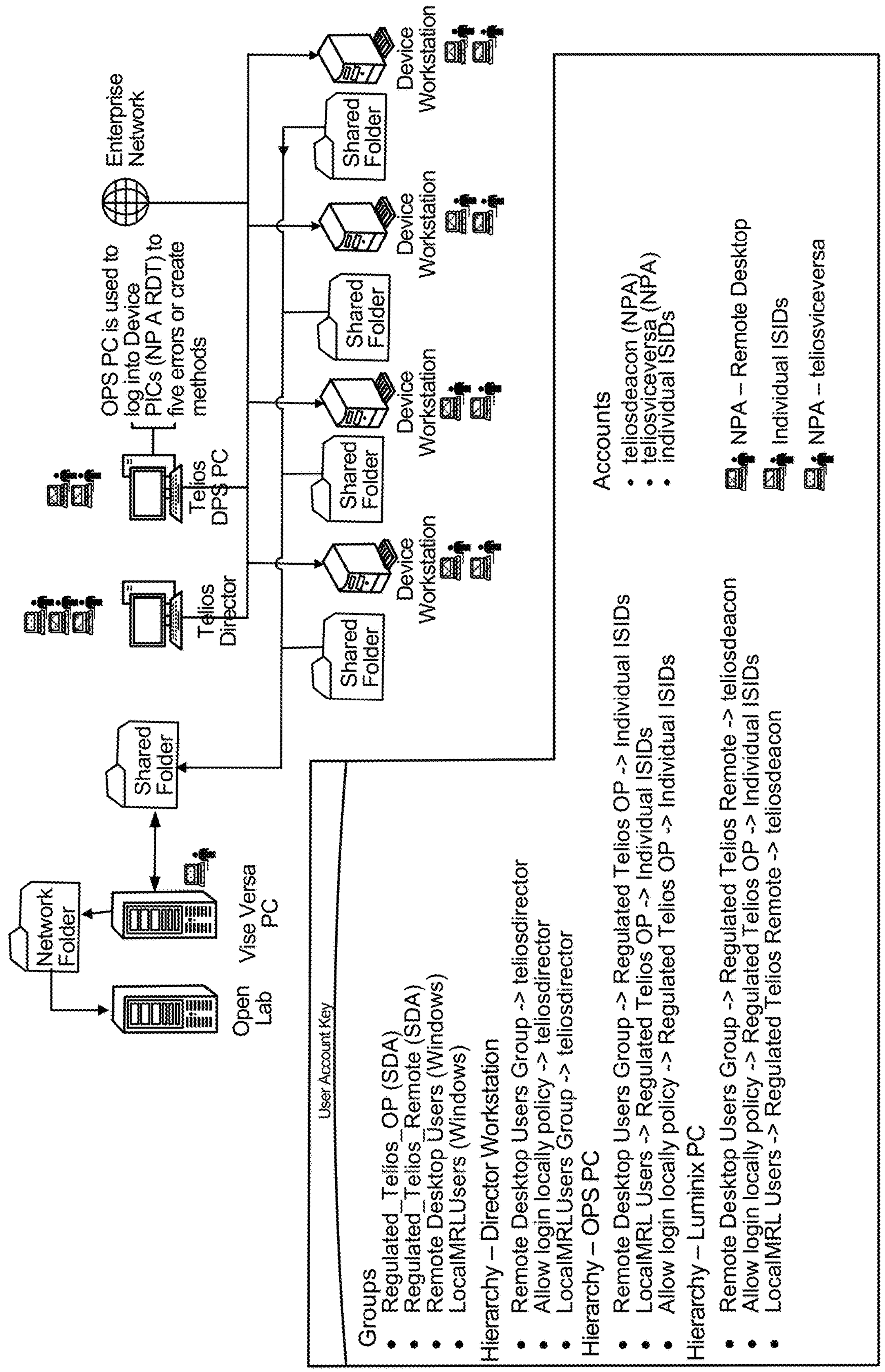
FIG. 5 provides additional data of the network configuration shown in FIG. 4, according to one embodiment.

FIG. 5 further illustrates the configuration of network permissions to provide the desired security, according to one embodiment. In FIG. 5, there are two networks: an enterprise network and the local Telios network. The device workstations, the Telios Director workstation, and Ops workstation have dual NICs with network ports so that they can be connected to both networks at the same time. The switch for the enterprise network is in a separate hub with all network connections. The switch may be in a wiring closet and use standard hardware. The Robot switch is on the platform. A primary NIC is built into the system and attached to the enterprise network (e.g., cables attached to the wall are connected to the enterprise network). In FIG. 5, one weight/style of line represents the enterprise network and another weight/style of line represents the device network. Each of the five workstations is connected to both networks.

The following process may be used by a user to authenticate for a director workstation. A user (e.g., a trained robotic scientist) may use a generic service account to access the workstation. The user launches the director executable and Telios launches, but all controls are locked by default. The user clicks on the “UNLOCK” button on the right control panel. A login window appears. The user will enter their userID and password. Access to the Telios Director is provisioned and the users userID is recorded in the trace file. The system may lock access to the Telios Director after a predetermined period of inactivity (e.g., thirty minutes), but this may not stop the execution of a run currently in progress.

The following process may be used by a user to authenticate for a driver workstation. The user may login through a remote desktop service and a policy setting will determine which users can access the console of the workstation. This may be managed through the remote desktop users group. The driver workstation may be headless (meaning, it will be configured to operate without a monitor, keyboard, and a mouse) and once access to the console has been established, the Telios generic service account may be used to authenticate to the operating system. The system may end the remote connection to the Telios Driver after a predetermined period (e.g., thirty minutes) of inactivity but this will not stop the execution of a run currently in progress.

In one embodiment, the following input field definitions are used:

\Data folder=Data files (**2) from readers for units read during online assays. Any instrument which generates ‘data’ is integrated such that the director is informed about what is generated. The director collects the data and brings back to this folder on director pc.

\Exe folder=Exe folder components: DirectorExe-3 files in total (TeliosDirector[VersionNumber].exe, aliases, .ini); LineUp_c_32.dll; MerckStm.ini, NI-DAQmx.ini; TeliosSystem.ini; TeliosWatchDog.exe (3 files in total), TeliosSystem.ini (**5), and TeliosTopology.csv. Contains files needed for the Director executable to open and run. The TPDEditor is also stored in this directory.

Inventory folder=Recommended organization is a ‘folder’ is made for each ‘project’; inside this folder are all of the files for the supported processes. Recommended naming convention of the inventory file is: ProjectName_#ofplates_date. Contains the System Inventory file and process inventory files (1) for individual assays. The Director reads in the information stored in the System Inventory file when opened and writes the most current inventory information to it when closed. The TeliosTopology.csv (6) and TeliosSystemInventory.csv must be present for the Director to open. Topology file contains information about each instrument station. TeliosSystemInventory.csv is a universal file. This file should be kept up to date and not used as a process inventory file (the file that defines the units to run in an assay). The Director when shutdown will write out the current inventory to this file, and upon restarting it will read this file in so that the inventory is persistent.

\Log folder=MessageLog.txt (this file is a log of all ‘messages’ the director has sent), ‘System’ folder=this folder contains AllocatedResources.sys, FuncUnit.sys, Hotel.sys, Inventory.sys, Operations.sys, Process.sys, RequestedResources.sys, TeliosNotifications- .sys—these are the 'storage system' files which the director periodically updates with all of its current arrays of 'system clusters'. This enables the restoration of system function if a catastrophic event occurs (i.e., pulling plug on director PC). These files are written every minute, as this enables the Restore Process Functionality.

\Ops folder=Run Summary (**4) csv files are saved to the location at the completion of a process. The 'run summary' file is placed here upon process completion. The run summary is all of the units trace entries combined in one file.

\ProcDef folder=Telios Process Definition (TPD) files (**7)=same structure as 'inventory' folder; recommended naming convention of tpd: ProjectName_briefprocdescription_versionID \SupportFiles folder=Any files to assist the operator with the Telios Systems such as user manuals.

\Trace folder=The final trace files (**3) for finished functional units.

Figure 6:
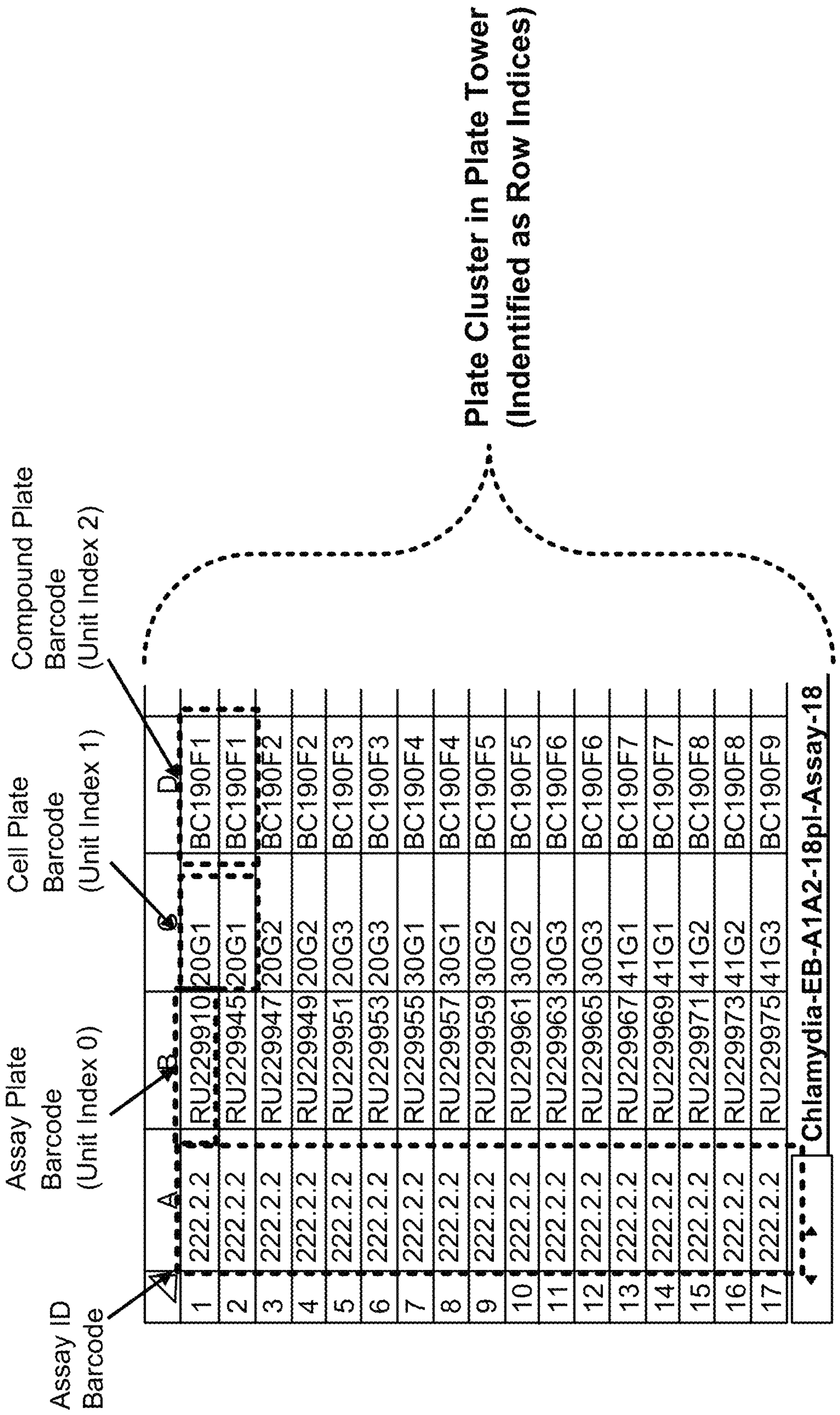
FIG. 6 illustrates a portion of an example process inventory file, according to one embodiment.

Note that a user may get an output of the teliostopology, inventory file, and tpd file—which are all harmonized by the same beginning of their respective file names (ProcRunId is that lead in). Further, 'STM'=STM is the communication package Telios uses; this folder is placed in C:\Program Files (x86)\National Instruments\LabVIEW 2020\user.lib A process inventory file is a type of input that may use the CSV format. It is typically user generated. In one embodiment, the process inventory file is a list of barcodes the director processes against the specified 'tpd' (telios process definition). The column the barcode appears in designates what 'unit' it is (i.e., 0,1,2, etc.). FIG. 6 illustrates a portion of an example process inventory file.

Instruments may generate data in text files. A driver may be used to change the file extension that is relevant to the source of the data.

Trace files includes the 'ops' which occurred to the functional unit or its associated units. When the director completes an op for a unit, it writes a trace entry. A trace entry is also created when a unit is inventoried and when a process starts. When a process is complete, a trace file is created summarizing main process information, and a trace file per unit is created detailing each op for a unit. In one embodiment, a trace file is in the XML format. The following is an example trace entry:

<TraceItem Barcode="ID252168" SerialNumber="836-82823" ISID="Cassaday" Number="1/1" Date="04/05/22" Time="15:08:19" OpSeq="0" Step="2/5" ParmInd="Combi6 100 uL" Operation="COMBI6 100 UL (6, ID252168,1,NONE,)"/>

Description of fields:

Barcode=Plate Barcode ID

Serial Number=Serial Number of Instrument

ISID=Operator ISID

Number=The unit number in the run.

Date=Current Date

Time=Current Time

OpSeq=Each step has several ops

Step=the step number in the tpd (not the spreadsheet row index)

ParamInd=detailed description (orparameters) of what that TraceItem Operation is **3

Operation:

Combi=Instrument type

6=station identifier

ID252168=the barcode of the plate that was at the station

NONE=legacy

A Telios process can run through several plates (units) in the respective inventory file. The xml file is showing information for one plate out of all plates in a run, so the "number" of this plate out of all plates (in the order it's listed in the inventory file—i.e., Number=3/7 is "this XML file/barcode is the 3rd plate out of 7 plates). Step is the step number in the tpd (not the spreadsheet row index). Each step also has several ops. This TPD Editor structure was implemented so that the user can generate 1 step, but the TPD Editor will automatically fill in the needed smaller Ops to execute that step. The ParamInd can be several things. For example, it can be read from the StepID column of the TPD Editor file spreadsheet (.tpd), which describes what the step is doing, (e.g., Pacing is always the 1st step of the tpd, and other steps could be "SUM 18to19—Rbtmv . . .") which means Single Unit Move station 18 to 19 Robot Move. As another example, each step in the TPD has other background steps (e.g., ops 1 through 7) that each TPD step goes through which are not always recorded in the TPD Editor steps (for readability and eliminating redundancy). For steps before pacing (initialization of the process by the Director that is not included in the TPD) and after TPD steps are complete—the ParmInd entry in XML may have values such as 1.000000, a file location, or just be blank, depending on what the director is doing.

A run summary file for a run includes information for units in a run. In one embodiment, a run summary file is a CSV file that includes information for all of the nits in a run combined together. In contrast, the corresponding .xml trace files are for individual units for a run. FIG. 7 illustrates a portion of a run summary file, according to one embodiment.

A TeliosSystem.ini file stores configuration settings that connect the director to the system's drivers and data handler and specify certain operating parameters. It is typically a text file and includes information such as the system ID, system type, I/O server, base path, program name, authentication process to be used, and other configuration properties of the system.

Figure 8:
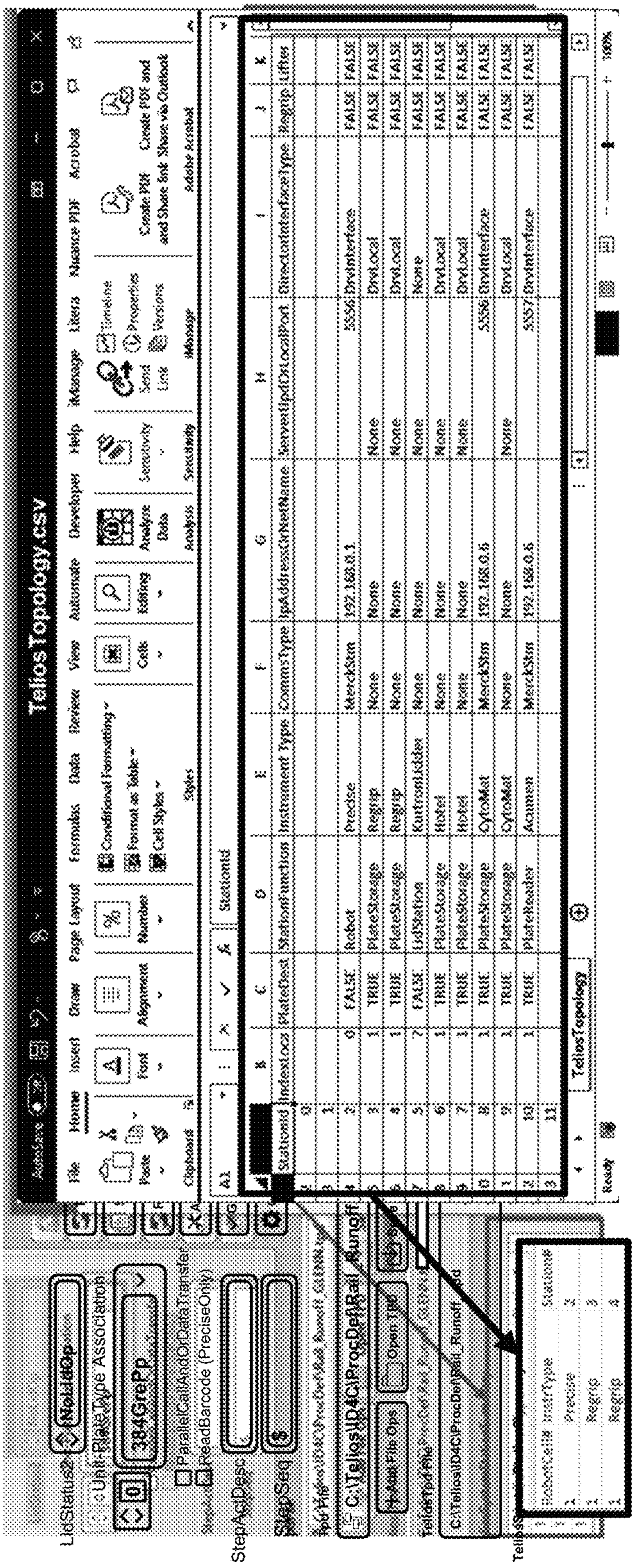
FIG. 8 shows a portion of an example TeliosTopology file, according to one embodiment.

A TeliosTopology file contains information about each station (e.g., what instruments are currently available). In one embodiment, the TeliosTopology file is a CSV file. FIG. 8 shows a portion of an example TeliosTopology file, according to one embodiment.

Figure 9:
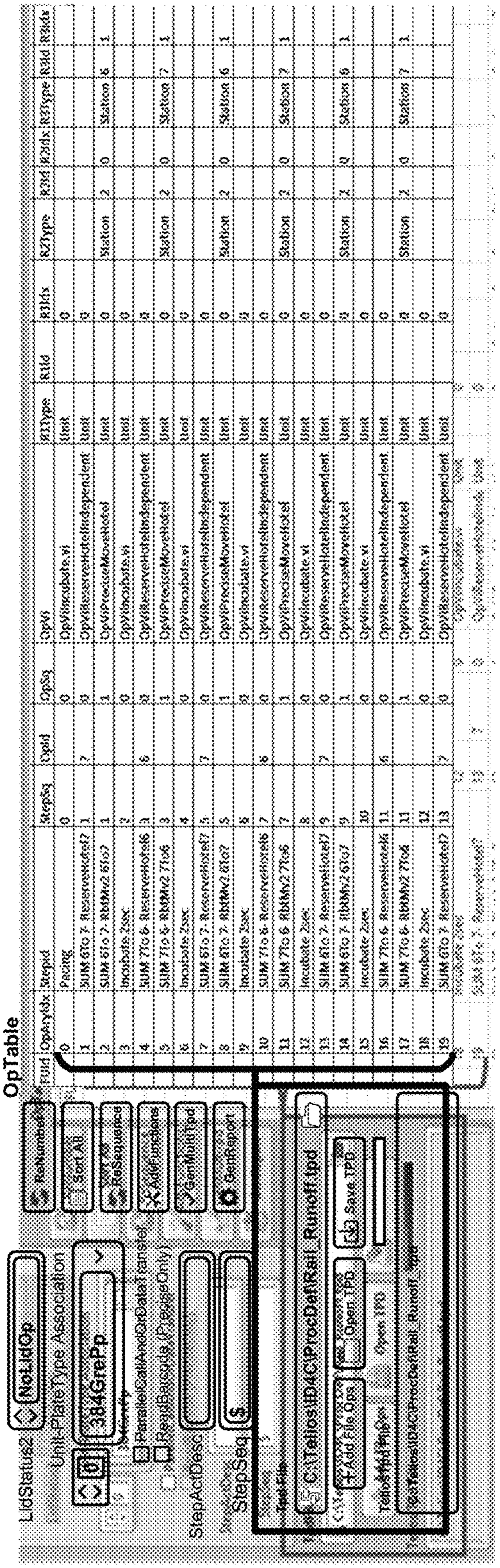
FIG. 9 illustrates a portion of an example Telios Process Definition file, according to one embodiment.

A Telios Process Definition contains step parameters provided by a user that define a set of one or more steps that may be performed (e.g., to perform an assay). FIG. 9 illustrates a portion of an example Telios Process Definition file, according to one embodiment. As can be seen in FIG. 9, the definition includes a set of steps that have a defined sequence, each with a distinct step ID and an indication of instructions to be used to cause another device (or devices) to perform the step.

Director Inventory files include a "virtual" set of information (cached) when looping vs. writing to a drive (as inventory is changing this may be stored programmatically). In one embodiment, the Director reads in the information stored in the System Inventory file when Director is opened and writes the most current inventory information to it when closed. The inventory manager may deposit this set of information into a CSV file when an "Inventory to File" button is pushed in the inventory manager in the director. When it is output from the inventory manager, it provides the most recent information. This may then be copied into the process inventory file. FIG. 10 illustrates a portion of an example Director Inventory file, according to one embodiment. In FIG. 10, column A is a barcode, column B is a stationID, column C is an index location of the unit at the station, and column D is lid status (true means "has lid" and false means "does not have lid").

A Driver Inventory file enables a computer controlling an instrument which has inventory (e.g., incubators, liquid handling stations with storage attached to it, etc.) to track. Manage, and/or use the inventory. In one embodiment, the driver inventory is updated manually when units are loaded to the storage device for the first time. Once the units are in the inventory and a process is started or the instrument is controlled manually from the driver, the driver inventory is automatically updated based on the location of the plate throughout the process. At the end of a process, unless the user specifies in the TPD Editor a virtual step as the last process step to change the home location of the plate from the original driver inventory to another driver inventory, the unit will stay in the original driver inventory. FIG. 11 illustrates a portion of an example Driver Inventory file, according to one embodiment. In FIG. 11, column A is a barcode, column B is an index location of the unit at that station, column C is a Stacker ID, column D is a Shelf ID, column E is an indicator of present/empty/reserved, column F is a lid status, and column G is an indicator of home location (true meaning that even if the unit leaves this location it is 'kept' so that nothing takes its place and false meaning that no such limitation is applied).

Figure 12:
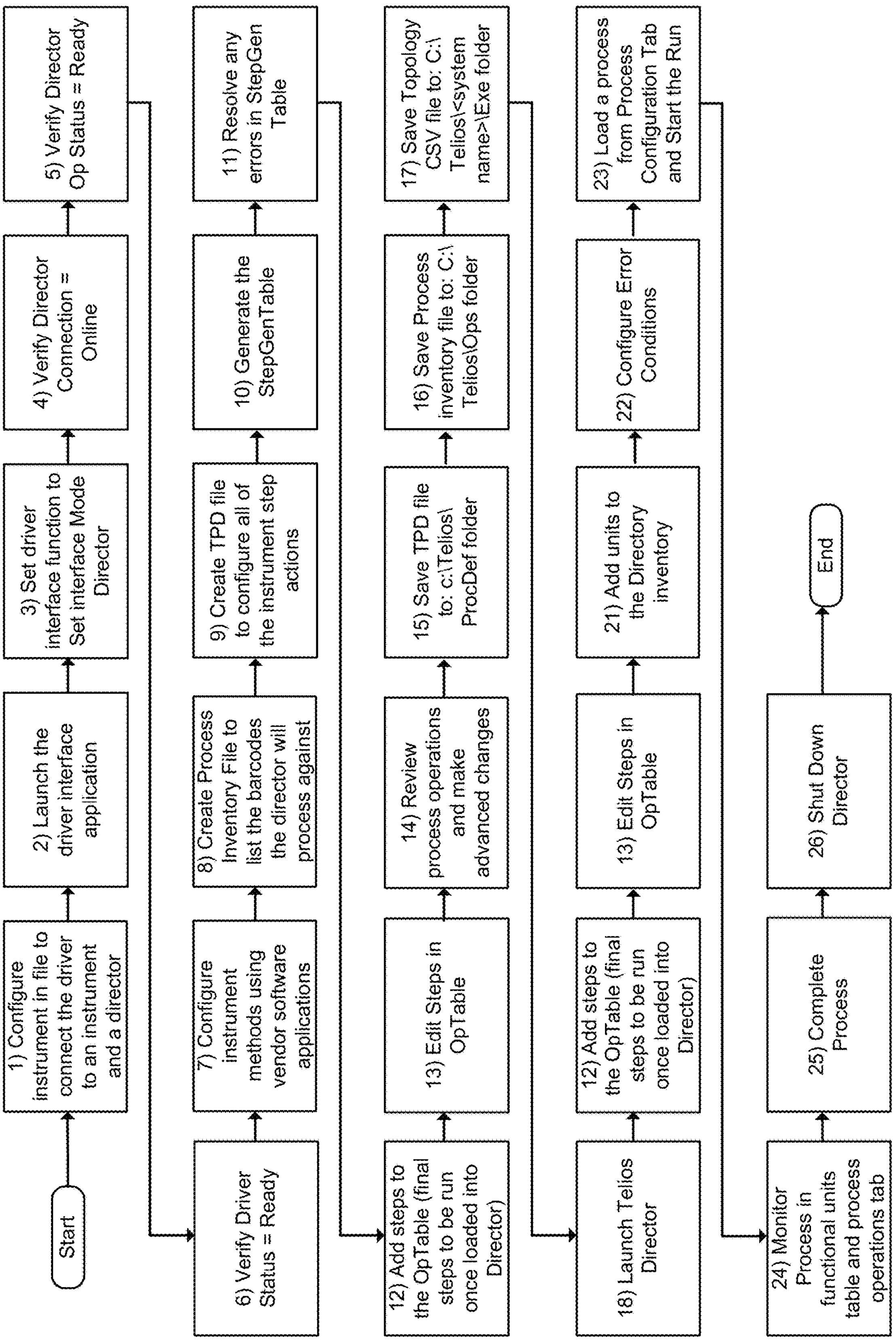
FIG. 12 is a flow chart illustrating driver configuration, according to one embodiment.

FIG. 12 is a flow chart illustrating driver configuration, according to one embodiment. This represents the information stored in the Telios system to enable it to efficiently operate various instruments. The process is generally broken down into three parts: configuring the instrument driver using an instrument driver application; configuring the instrument's step actions using the Telios Editor; and configuring and executing a process run using the Telios Director.

In the embodiment shown, the driver configuration begins by configuring an instrument ini file to connect the driver to an instrument and the director. The driver interface application is launched and the driver interface function is set to a "set interface director mode." The system verifies that the director connection is online, the director operational status is ready, and the driver status is ready. The system configures instrument methods using the vendor's software and creates a process inventory file to list barcodes the director will process against. The system also creates a TPD file to configure the instrument's step actions and generates a StepGenTable for the instrument. Any errors in the StepGenTable are resolved and steps may be added to the OpTable (these being final steps to run once the driver is loaded into the director). The steps in the OpTable may be edited and the process operation reviewed (with any desired changes being made). The TPD and process inventory files are saved along with a topology CSV file indicating the topology of the networked environment. The director is launched and sets a station's instrument parameters, which may be viewed at this time. Units may be added to the instrument inventory or inventories. Units may also be added to the directory inventory. Error conditions may be configured and a process is loaded from the process configuration tab (e.g., in response to user selection) which is started and run. The process may be monitored in a functional units table or process operations tab. Once the process completes, the director may be shut down.

Figure 13:
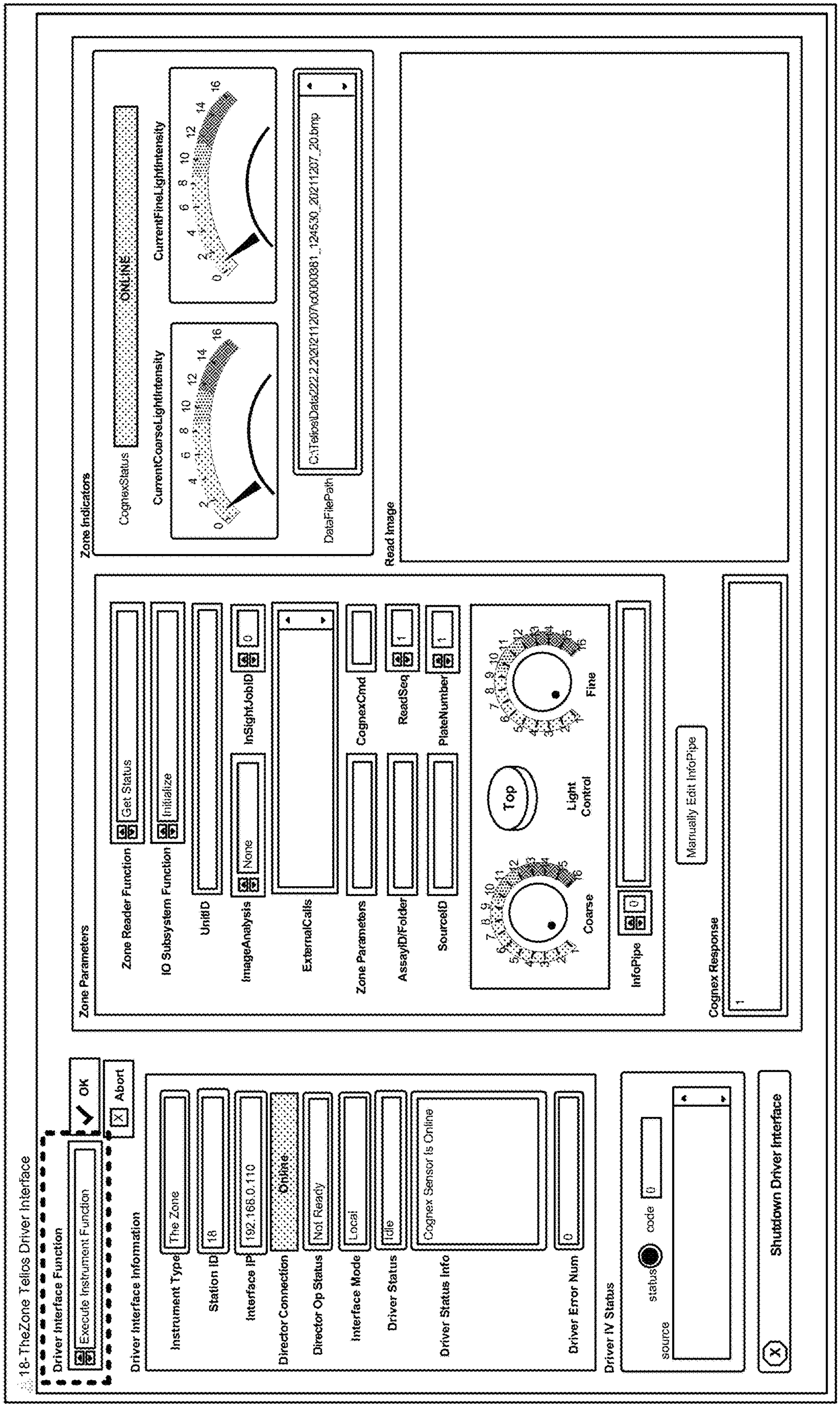
FIG. 13 shows a driver interface, according to one embodiment.

FIG. 13 shows one embodiment of a driver interface. In the embodiment shown, the driver interface includes a portion for driver interface functions and a portion for driver interface information. Generally, each driver has its own executable file. The Telios driver interface function portion provides the ability to control the driver connections and actions on instruments. The Telios driver provides an "Instrument Parameters" section. This may be the same for every instrument type. The following table describes the functionality provided in the illustrated driver interface function portion:

| Function | Description |
|---|---|
| Execute Instrument Function | Can only be used if "Set Interface Mode Local" is selected first. Allows the user to manually control the instrument and configure a single method into the Instrument Parameters section. |
| Re-Initialize Driver Interface | Re-initializes the driver interface. Not meant for use by standard users. |
| Set Interface Mode Local | Allows the user to manually control the instrument. |
| Set Interface Mode Director | Opens communication to the director for automatic control over the instrument. This stops any manual communication on the driver; all commands must be made on the director to function. |
| Abort Instrument Function and Abort Button | Stops the instrument from preforming further actions of the method. |
| Shutdown Driver Interface | Closes the connection with the instrument and the driver interface application window. |

The Telios driver interface information section provides feedback information from the driver to inform the user of its current statuses. The following table describes the information provided in the illustrated driver interface information portion:

| Option | Description |
|---|---|
| Instrument Type | The instrument currently integrated with driver. |
| Station ID | The station number of where the instrument is physically located. This also holds the coordinate information for robot access. |

-continued

| Option | Description |
| --- | --- |
| Interface IP | The IP address of the computer the driver is operating on. |
| Director Connection | Indicates whether the driver is online- connected to a director- or offline-in local mode. |
| Director Op Status | Indicates the current state of the director:<br>a. Ready- the driver is connected to the director and instrument is ready for command<br>b. Complete- the instrument has finished commands from director with no errors<br>c. Processing- the instrument is in use or has an error<br>d. Not ready- the driver is not in a state to receive commands from director. |
| Interface Mode | Indicates whether the driver is in local mode or director mode. |
| Driver Status | Indicates the current state of the driver:<br>a. Busy- not ready<br>b. Ready- idle and ready for a new method to be loaded<br>c. Error- an internal or external problem is inhibiting instrument from operating correctly |
| Driver Status Info | Description of Driver Status. Any error info is also passed to AutoQC. |
| Driver Error Num | Not used. |
| Shutdown Driver Interface | Closes the connection with the instrument and the driver interface window. |

In one embodiment, to operate a driver, the user may select between a director or local mode. In the director mode, the instrument is operated autonomously through the Telios Director on the Director Workstation computer. In the local mode, the instrument is operated manually from the Telios instrument driver installed on the computer connected to the instrument. NOTE: the local interface may also be accessed from the Director's instrument control panel when the driver is set to director mode.

In various embodiments, the Director mode enables the Telios Director to send commands to the driver for automatic process execution. A Telios Driver interface within the Director GUI can also be accessed for manual control and quick error resolution without having to switch to the Driver computer and setting the driver to Local mode. Director mode enables the instrument to be used with robots and in parallel with other instruments. Once the "Set Interface Mode Director" option is chosen and the OK button has been hit, the "Director Connection" indicator will light up as "Online." Instrument-specific methods can be sent to instruments and the user can create a larger method using the Telios TPD Editor involving the instrument protocol and any other online instruments (as well as instruments without drivers, such as a hotel). The driver interface may display status updates but may not allow the user to change settings or send commands while connected to the director. The director may fault, and no method execute, if a user tries to operate with a director while the driver is in local mode settings. If the driver is in director mode, commands may not be able to be sent through the instrument parameters with the driver interface.

In various embodiments, the local mode enables settings that are used to control the instrument through the Telios Driver Interface on the computer directly connected to the instrument. The user clicks on the Driver Interface Function box to display its options, selects "Set Interface Mode Local," and presses the green OK button. The user selects an option under instrument parameters and fills in any configuration parameters for the selected option. The user selects "Execute Instrument Function" from the Driver Interface Function options and presses the OK button to send a command to the instrument.

In various embodiments, the Telios driver provides an "Instrument Parameters" section which enables configuration of the parameters necessary to carry out the actions of an instrument function in either director or local mode. The instruments parameters section may have the following options available (plus, in some instances, instrument specific options):

| Option | Description |
| --- | --- |
| Initialize | Connect to that instrument and get it ready to be used |
| Abort | Abort that specific instrument |
| Get Status | When robots are moving plates from/to devices; moves the stage back to where the robot has been taught to deliver the plate (in the event something was moved) |
| Clear Error | Instrument had an error or it was aborted; contains the functions to send to that instrument so it can be used again |
| Acknowledge Complete | Some instruments have this button on the driver itself (separate from the Acknowledge Complete button in the director by the instrument control panel). This is either under Driver Interface Function or in the parameters menu. |

Where instrument-specific options are available, selection of those options causes display of the appropriate selectable parameters or controls.

The IO Subsystem function may have the following functions available (plus potentially other instrument-specific options):

| Option | Description |
|---|---|
| Get Status | Moves plate nest to receiving position. |
| Clear Error | Must select to clear driver of error and resume method. |
| Abort | Stops the instrument from preforming further actions of the method. |
| Initialize | Connects the driver to the instrument. |

The Telios driver may also provide an "Instrument Indicators" section which displays relevant information for the user to view or director to collect.

When the user selects "OK," the driver executes. In one embodiment, the "DataFilePath" contains the location for the file that is collecting the data. As the Director executes this, the parameters may be auto populated here (this is what the driver populates for the director to read back specifically as an indicator section—parms in, indicators out). • The driver interface cluster (which is the master thread of info) is sent back and forth between director and driver. At the driver level the parms and indicators are extracted from the driver interface cluster and loaded into the driver parms and indicators.

Figure 14:
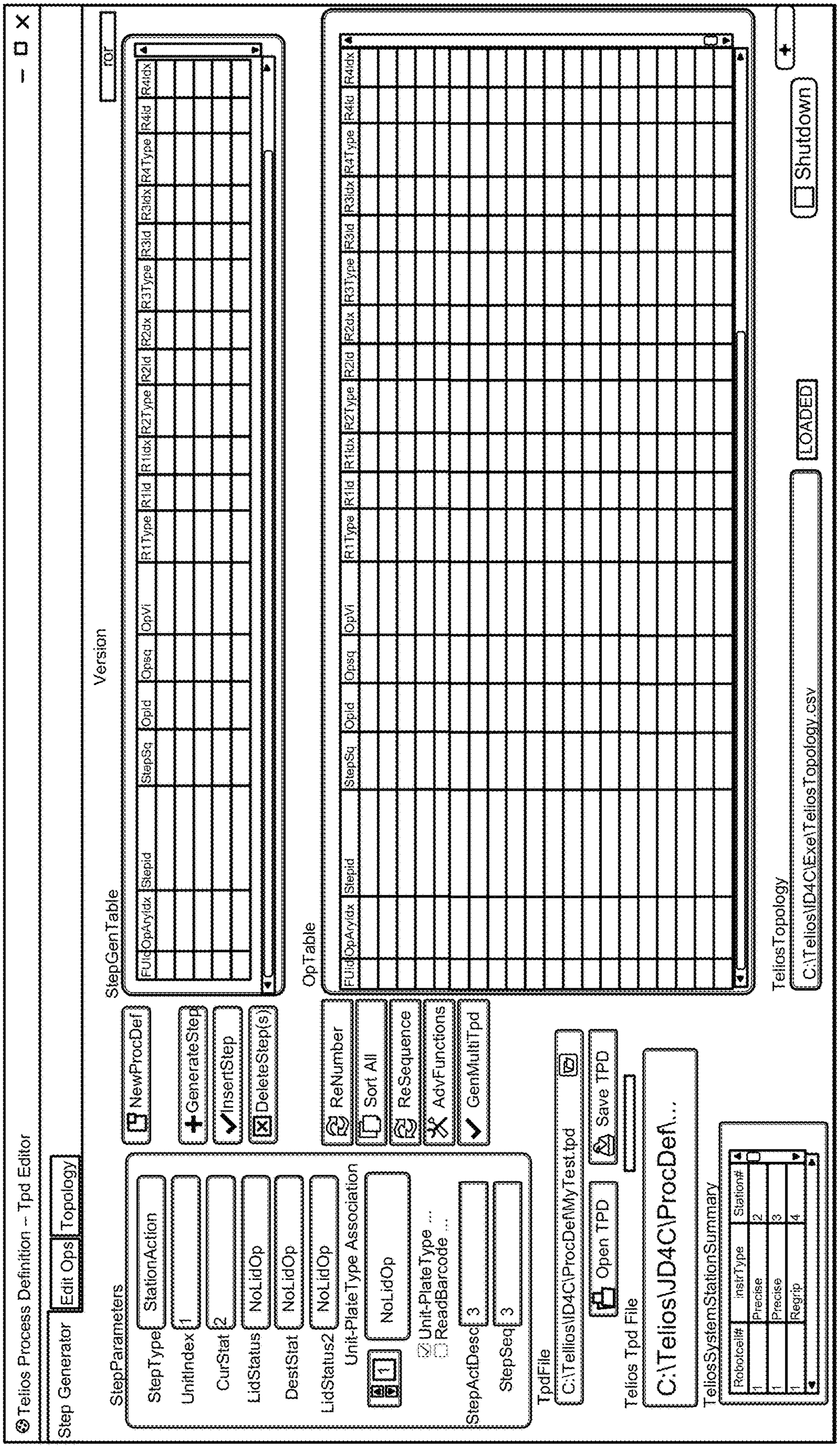
FIG. 14 illustrates an example user interface for the TPD Editor, according to one embodiment.

The TPD Editor provides the ability to create multistep protocols for Telios platforms that contain multiple instruments and robots. These robots and instruments are first integrated onto the platform and its Telios Topology and then made available in the Editor. FIG. 14 illustrates an example user interface for one embodiment of the TPD Editor. In the embodiment shown, the user may load an existing Telios Process Definition or start a new one. The user loads a topology file and the summary portion of the user interface is populated with the available instruments. The station number and robot cell of each instrument may be displayed in conjunction with an identifier of the instrument. The Topology tab of the TPD Editor may be filled in with the TeliosTopology.csv values.

The TPD editor may be used by a user to create new process steps within a steps parameters section of the user interface. In one embodiment, a step is defined by one or more of the following parameters:

| Parameter | Description |
|---|---|
| StepType**1 | The available step options that the system can perform. |
| Parameter | Description |
| UnitIndex | The index number of the units to use in the selected step. This corresponds to the columns numbers in the Process Inventory File. The first column is 0 (almost everything is 0 based in Telios). |
| CurStat | The station number the unit is occupying in the beginning of the step. Station numbers are listed in the TeliosSystemStationSummary box. |
| LidStatus | Options for the plate lid as they move from the current station to the destination station.<br>a. No Lid Op- Take no action with a lid; send no commands to the Delidder station.b. Delid- robot stops by and sends command to Delidder station to take the lid off before arriving to destination.<br>c. Relid- robot stops by and sends command to Delidder station to put the lid on before arriving to destination.<br>d. Waste Lid- robot stops by and sends command to Delidder station to remove lid at the bottommost Delidder shelf and drop to waste before arriving to destination. |
| DestStat | The station number of the destination instrument. Station numbers are listed in the TeliosSystemStationSummary box. |
| LidStatus2 | This is only used when operating on a multi-cell platform, when a unit travels from one cell to another cell on a moving track. Lid must be put on<br>before traveling on the track following the LidStatus parameter above and taken off if needed after traveling on the track using the LidStatus2 parameter. Performs the chosen lid option when the plate reaches the destination cell. |
| Unit-PlateType Association | An array of plate types corresponding to the unit indexes (0, 1, 2, . . . N) used in the tpd. Unit index corresponds to the columns in the Process Inventory File. Among other functions, the type of plate is programmed into the robot so that it knows how to pick up the plate. |
| ParallelCallOr DataTransfer | With this checked upon step generation a pop-up window will be required to configure the parallel call and info pipe, it is not required to activate both.<br>Parallel call is used when two actions should be started by the system at the same time. This is not often used.<br>Data transfer is used to pull files from instruments to other PCs, among other uses. |

-continued

| Parameter | Description |
|---|---|
| ReadBarcode (PreciseOnly) | With this checked if the op being generated is a precise robot movement, a barcode read will be added as part of the single unit move. |
| StepActDesc | Optional section to add a user defined description of a station action. This then populates the Step Id of the OpTable. If left blank, the instrument type and station number are automatically populated into the StepId. If the station action is incubation, the director will populate as "[instrument type] [station number] incubate", so the user does not have to add the word incubate to description. |
| StepSeq | Only for use if the step will not be the next chronological step in the OpTable. When left blank, the director will number the step as the next highest number in the OpTable. This is used, for example, when inserting a step into the middle of the table. |

A step type selected in the Step Parameters may be actually comprised of a series of smaller operations (ops) for the platform to complete, which are auto-populated for ease of use.

The following table illustrates example step types that may be available in the TPD editor:

| StepType | Description |
|---|---|
| Single Unit Move (SUM) | Moves a unit from the current station to a new destination station. |
| Station Action | Commands the current station to preform one of its instrument-specific functions. When chosen and "Generate Step" is clicked, the instrument parameters will pop-up for the user to select which function to perform.<br>UnitID field in the top right corner is usually filled in automatically by Telios Director.<br>Not all parameters need to be filled in (e.g., InfoPipe). Consult the instrument Telios driver manual or knowledgeable personnel on which fields to fill out and how.<br>Some "station actions" to be performed on some instruments like VSpin and incubators have unique StepTypes (see below for SpinAction ad Incubate). |
| Virtual Action | Gives the user the option to:<br>a. relocate unit- move the virtual home location of the plate to a new one. E.g., if a plate starts in an incubator, that is its home location, and if the plate ends in another incubator, that is its new home location, and it needs to be reset using this step after the plate moves to the new location.<br>b. unit waste- changes the home location of the plate to = x. This deletes the plate from incubator driver inventory, but not the director inventory manager.<br>c. DataOperation - a custom executable can be run for data file manipulation, generation, movement, or a custom Merck program (ARIP) may be activated for file movement<br>Note: Neither step should be added until after a unit has already been imported to the new home location or the unit has been delivered to a waste chute. |
| Spin Action | Select for a station action at a Vspin instrument which will individually make ops for Load, Spin, UnLoad. Click "Generate Step" to input spin parameters such as RPM. If it is desired to have the Load, Spin, Unload occur as one operation, then use Station Action step to achieve this. |
| Incubate | Instead of using Station Action step for incubators, use the Incubate step. Specify the incubation length in seconds. |
| Cassette Move | Select to load or unload an HPD 300 cassette to or from the HPD 300. |

The TPD Editor may provide the ability to add a newly generated process step to a StepGen Table (which may be used to verify the steps before adding them to the final OpTable).

The following table includes call option window parameters that may be available in the TPD editor:

| Parameter | Description |
|---|---|
| Parallel Call States | a. Parallel Call- Allows a step to be started, then move on to the next step before the first is finished.<br>b. Parallel Call Return- when the additional operations are completed after the initial parallel call, the return is called to monitor the original station on the parallel call, the |

-continued

| Parameter | Description |
|---|---|
| | station action can be complete or still in operation.<br>c. No Call- All steps are run and complete in chronological order. |
| OpDataTransferConfiguration (i.e., InfoPipe) | InfoPipe elements :<br>Store/Receive , File/Parms , OvrWrt/AddOn<br>Unit Index , StationId, InfoIdFlag.<br>Methodology : A File(s) or Parms (virtual information) is [stored or received], if stored it [Overwrites or is Added On] to what is currently stored. The storing or receiving is designated by the [Unit Index, Station Id], and if it is an array of information the [InfoIdFlag] determines which elements of the array are stored or received. This association is kept in the Inventory Manager. |

To improve performance, when a parallel call is initiated, a parallel call return may be executed at the same station later on in the assay to 'complete' the station action which was originally executed.

In various embodiments, a step is generated and populated in the StepGenTable for the user to review before adding it into the final OpTable. Example driver interface functions that may be included arte shown in the following table:

| Functions | Description |
|---|---|
| OpAryIdx | The hierarchy of each operation in the total process; spreadsheet index of the OpTable. |
| StepID | A description of the operation. Auto-generated description + StepActDesc user input if any, |
| Step Sq | The step sequence (number) in the overall process, TPD. StepSq number is generated for each new Generated step. A step can have several auto-populated Ops (see below). |
| Op Id | Auto-generated step action description. A step can consist of several Ops, which are auto-generated by the TPD Editor for ease of use. Like steps, ops can<br>be deleted, modified, and inserted.<br>For example, if a plate is to be put on an incubator nest without being imported, the auto-generated Import op in the SUM step should be deleted. |
| Op Sq | The operation sequence for an individual step. This is 0 based and restarts for each new step. |
| Op VI | The name of the Lab View VI for that operation. |
| R[#]Type | The resource type. R1 is usually the unit (i.e., plate). R2+ are usually stations (e.g., instruments, hotels, re-grip station). When a resource is included in an op, it is held while that specific op is running. This ensures the resource cannot be used by any other unit, station, or op until the op is complete and the resource is released.<br>When using multiple units within an Op, e.g., using a tip box and a plate in a liquid handler, the TPD Editor will not automatically add all needed units as resources; the resource will have to be added in manually to the appropriate op (see AdvFunctions button)<br>When deleting or inserting Ops manually, e.g., deleting the Import Op on an SUM from a station to an incubator, the incubator will have to be added as a station resource to the appropriate Ops, because another unit (plate) may try to go to the same incubator nest, since typically it is empty after a SUM since a plate is imported into the incubator (see AdvFunctions button) |
| R[#]Id | The station number of the stations used in the operation. This can be checked in<br>the "Telios System Station Summary" box. Not applicable to units. |
| R[#]Idx | A 0 based index ordering the resources used in an op. Units and stations are not<br>grouped together.<br>a. For units- this is just the unit index.<br>b. For stations- where this station is in the array of stations for the operation. |

Typically, a step includes three ops (if the unit is moving between stations within the same cell and no lid options are selected), but some steps include more or less ops. Op 0 will usually check the status of the destination station. The second Op (Op 1) usually then checks the status of the station the unit is currently on, unless the station does not have a driver, such as a Hotel. A unit may move only when both stations are available and ready. A SUM between multiple cells or lidding or delidding a plate may have additional ops to include these options. A SUM to or from an incubator may have additional ops to import or export the plate, since that is the most common application of an incubator. A SUM to or from an instrument requiring a plate to be re-gripped at a re-grip station amy also have additional ops to stop by the re-grip station. A SUM for which a lid op was selected (delid, relid, or waste) may have additional ops to stop by the delid station.

A Single Unit Move that involves an incubator or hotel is different than a typical SUM since that driver's inventory will change. If moving a plate from an incubator, the export is part of the get status current station. If a plate is moving to an incubator, the get status destination may look for the first empty index available. If one is not found, the step may wait until a position becomes available before going to the next step (this will not cause an error from the director). Conversely, if one is found, the index may be set to "reserved" in the driver inventory, and the SUM may run. The station may not import the plate as part of a SUM. The operator may then want to add an Incubate or Virtual Action-relocate, depending on the assay.

Once a step has been generated, added to the StepGen Table, and checked for any errors (errors will appear in the cells of the StepGen Table), the step should be added to the OpTable (which contains the final steps in the order they will be run once loaded by the Director). If the ops in the StepGenTable are correct and without error (errors appear under the "OpVi" but can also appear in other locations in the form: ERR, Error), they can be added to the OpTable by clicking the "InsertStep" button. The OpTable contains the final steps in the order they will be run once loaded by the Director. The TPD Editor may also provide the ability to delete, renumber, resequence, and/or sort the steps within the OpTable.

In some embodiments, the TPD editor can provide advanced functionality, such as the example shown in the following table:

| Advanced Function Option | Description |
|---|---|
| Add Resource to Step(s) | Allows user to add a resource to a step to hold that resource while the step is performed. NOTE: A station will not automatically be held during a parallel call or parallel call return. The station will have to be added to the next set of ops the system preforms during the parallel call. This is also the case with using multiple plates in a step-they must be added in as resources. |
| ChangePlateType | First in the Step Parameter, under Unit-PlateType Association, choose a unit index and adjust the plate type to the desired type. Then in the advanced function window fill in the index of the unit whose plate type was adjusted. |
| ReAssign Resource ID | Changes the current unit index. Resource ID refers to the resources associated with each step. E.g., If more units and plate types were added or the columns in the |
| Replicate Step(s) or Generate a Time Course | Allows user to choose a range of steps to replicate and how many replications. When the Boolean below the numeric controls is pressed, it switches to a GenerateTimeCourse button that will allow the user to generate a time course from the chosen range of steps and repetitions. |

If a button in the replicate steps dialog box is pressed, it may activate a green button that says GenerateTimeCourse. The user may enter the step range to generate a time course and the replicate number.

In one embodiment, the TPD Editor provides the ability to configure the following for a time course type: station to generate the time course for, unit of time for which the time course will be generated in, the time for the system to complete one cycle of the core operations, and different peripheral times for each read sequence. If the "ReplicateSteps" button in the Replicate Step dialog box is pressed, it may change to a green button that says "GenerateTimeCourse." Clicking the "GenerateTimeCourse" button may cause display of a ConfigureTimeCourse.vi screen. The operator can then choose to generate either a static or dynamic time course. The following table illustrates some options that may be available in this context:

| Option | Description |
|---|---|
| StationToTimeCourse | The station for which the user would like the time course to be generated for, usually an imaging station |
| UnitOfTime | The unit of time, in hours or minutes, for which the time course will be generated in. |
| PeripheralTime(s) | The time it takes the system to complete one cycle of the core ops that are being replicated, in seconds. Will be taken off the incubation step to account for the difference |
| MultipleTimes? | If a different program is run on each read and varying peripheral times are needed, the "MultipleTimes?" checkbox must be checked to initialize and enable the peripheral time array to input varying peripheral times for every read sequence. Note: if the "MultipleTimes?" checkbox is checked, the single "PeripheralTime(s)" control will be disabled and grayed. |

The TPD Editor may also provide the ability to configure a Static Time Course, which includes the time of the first station action/read that will be generated by the time course, the time interval between each read though when the steps are generated, and the program/method station action instrument will execute at every interval. The following table illustrates options that may be available in this context:

| Option | Description |
|---|---|
| InitialTime | Must be the time of the first station action/read that will be generated by the time course. This is the first/initial plate read sequence/run order that the TimeCourse will generate after the pre-existing read-sequence that the ops are being replicated from. |
| IncubationTime | The time interval between each read though when the steps are generated. The read sequences will increase according to this incubation time, though the actual incubation time will account for any peripheral time. |
| ProgramName | The program/method station action instrument will execute at every interval |

In contrast, a dynamic time course includes the time at which plates are read or imaged by the designated station and the program or method file name that the user would like the chosen station to execute. The following table illustrates options that may be available for a dynamic time course.

| Option | Description |
|---|---|
| ReadSequence | Must input for each read. The time at which plates are read or imaged by the designated station. The first read sequence entered the array must be the first time that the time course will generate after the read already in the TPD editor. If the plate was read at time 0 hr and then it incubated for 2 hours and then the steps were replicated for a time course, the first read that the time course would generate is 2 hours. Incubation times are |
| Option | Description |
| | automatically calculated from the difference in the read sequences. Peripheral time will be accounted for in the incubation times. |
| ProgramNames | Must input for each read. The program or method file name that the user would like the chosen station to execute. |

In one embodiment, the TPD Editor provides the ability to combine multiple process definition files into one file. The MultiTPD still uses one Process Inventory File (PIF) but allows the user to assign specific TPD files to each row in the PIF or a pattern of TPDs assigned to rows. The file generated can be run from the Telios Director when the Process Type is selected as MultiTpdFromFile. The Telios Director may have an applet to create a MultiTPD: MultiProcDef Editor. Example options include:

| Option | Description |
|---|---|
| ProcDefFolderPath | Folder path where the 'TPD' files reside which will be used |
| TotalNumber ProcDef | Specifiy the number of ProcDef files (TotalNumberProcDef) to be used and press 'InitProcDef'. This populates the ProcDefArray with all the 'TPD-s' in the chosen directory populating the Dropdown 'ProcDef'. |
| ProcDefArray | Select the TPD (ProcDef) and the number of iterations for each TPD to build a pattern. This pattern will be displayed on the right in the MultiProcessFile and will iterate over the Process Inventory File (PIF). It iterates such that each TPD is applied to each row in the PIF.<br>E.g. |

-continued

| Option | Description | | |
|---|---|---|---|
| | MultiProcessFile | Process Inventory File | TPD used for the units |
| | TPD1 (2 iterations)<br>TPD2 (1 iteration) | Plate1 \| Tips1<br>Plate2 \| Tips2<br>Plate3 \| Tips3<br>Plate4 \| Tips4 | TPD1<br>TPD1<br>TPD2<br>TPD1 |
| MultiProcessFile<br>'GenerateMultiProcessCsv' button | Display what the resulting configuration is before saving.<br>Will write and save the file (must specify a name including the '.csv' extension). | | |

Figure 15:
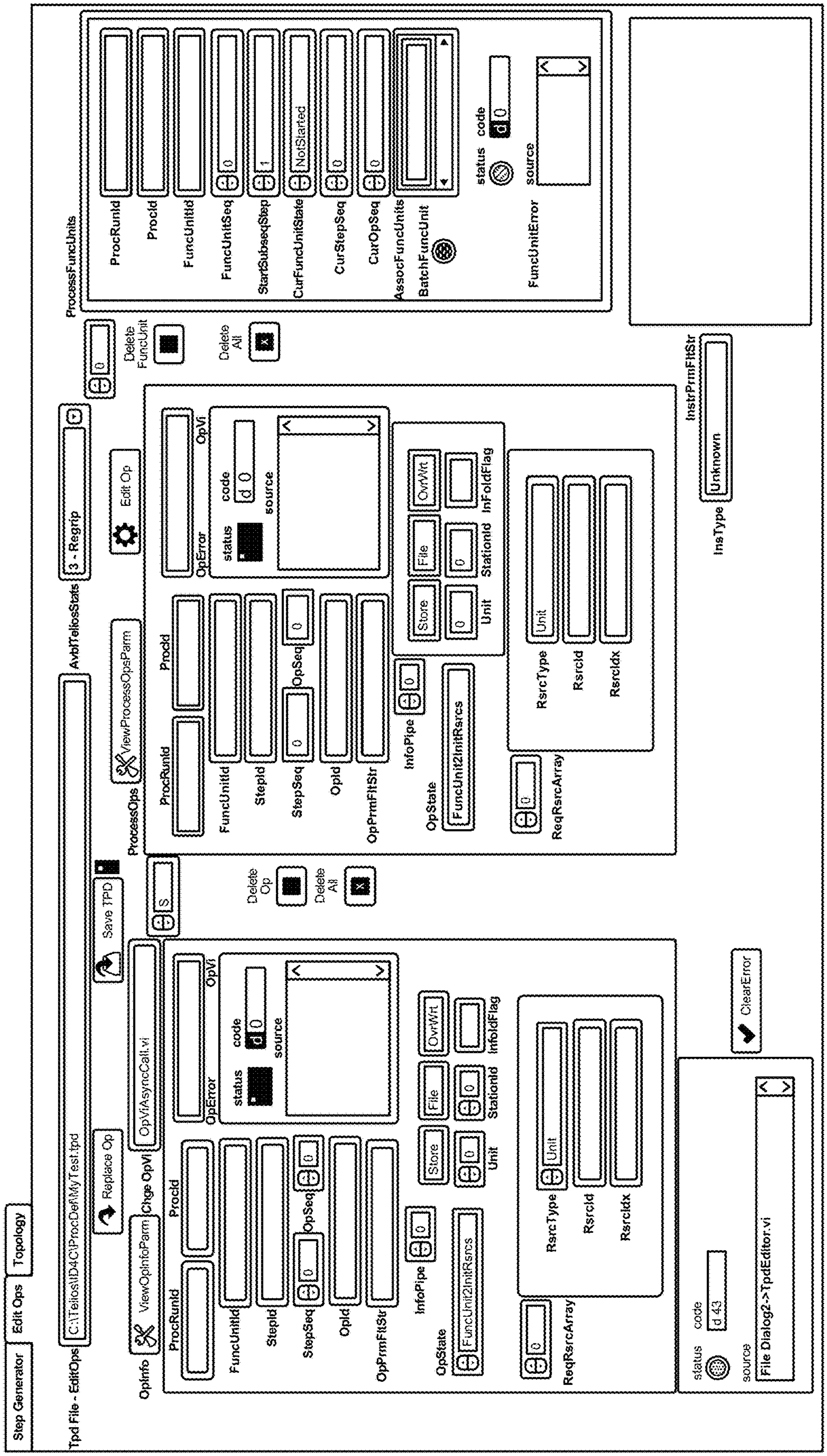
FIG. 15 illustrates an Edit Ops tab including controls for editing an op in an example user interface, according to one embodiment.

In one embodiment, the TPD Editor provides the ability to look at the process operations and make changes to them. FIG. 15 illustrates an Edit Ops tab including controls for editing an op in an example user interface, according to one embodiment.

Options for editing a process op may include:

| Option | Description |
|---|---|
| ReqRsrcArray | Contains an array of the resources used in the selected op. Use the scroll box to view each resource's information. |
| InstrPrmFltStr | Displays the instrument type used in the selected op. |
| Delete Op button | Deletes the selected op. |
| Delete All button | Deletes all ops. |
| ViewProcessOps Parm button | Displays the instrument parameters of the instrument used in the selected op. |
| Edit Op button | Populates the op information to the OpInfo section on the left, where the op can edited. |

In one embodiment, the TPD Editor provides the ability to display the full topology that is loaded when the Editor is launched. FIG. 16 illustrates an example view of the topology in the user interface, according to one embodiment.

Figure 17:
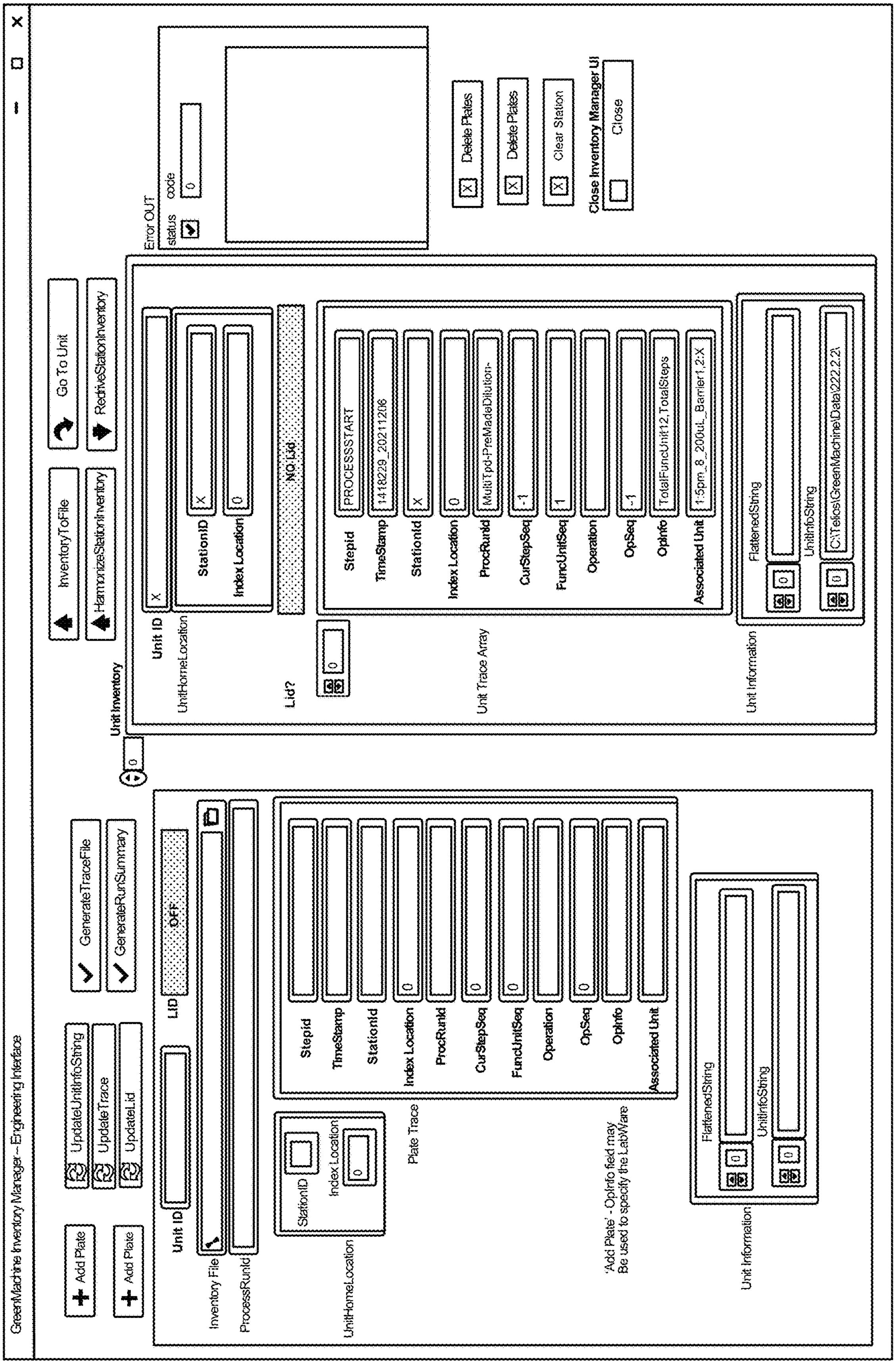
FIG. 17 illustrates an example inventory manager user interface, according to one embodiment.

In one embodiment, the Telios Director provides the ability to add a unit's barcode to the Director inventory. The inventory represents the plates that the system has for processes. Before a process can run, the plates involved are added to this inventory (e.g., through the Inventory Manager in addition to being in the Process Inventory File, and in the Driver inventory). The Inventory Manager includes the options to: send a storage device's inventory to the director, load an inventory file, or harmonize the Director inventory to a storage device's inventory. FIG. 17 illustrates an example inventory manager user interface, according to one embodiment. The inventory manager may provide the following options:

| Field | Definition |
|---|---|
| ReceiveStationInventory | Communicates directly with instruments that have their own inventories, for example incubators and liquid handlers.<br>First, from the instrument driver, update the driver inventory .csv file.<br>Click the ReceiveStationInventory button. Enter station number to receive the inventory.<br>Next, to keep track of changes easier, choose "InventorytoFile", and the inventory file in C:\Telios\| |
| HarmonizeStationInventory | Communicates directly with different stations. This option is usually not used because of its complexity (it is better to manually update the Driver inventory at the Driver PC and then "ReceiveStationInventory")<br>Director to Driver Inventory - overwrite the existing driver inventory with that of the Director.<br>This prompts a window to appear for the user to enter the Station Id to update.<br>Checking 'Overwrite Units?' will overwrite the existing driver inventory with that of the Director.<br>Not checking 'Overwrite Units?' allows the Director to compare both inventories.<br>If there are units with home location set to true in the driver that the director has no knowledge of an error will occur. |

-continued

| Field | Definition |
|---|---|
| | If a unit exists in the driver inventory with home location set to false and 'Overwrite Units' was not checked, this unit will be left untouched |
| Add Plate or Delete Single Plate | Used to add or delete a single plate from the Inventory Manager. The following options are available for selection:<br>Unit ID (plate barcode)<br>LID info (off unlit Boolean is no lid, on is lid present)<br>UnitHomeLocation info (station ID and index location of where the plate is loaded- only needed for Add Plate)<br>Plate trace information<br>(optional) OpInfo to specify the Labware type (Labware type is only needed to update a Biomek FX inventory) |
| Add or Delete Multiple Plates | 1) Create a .csv file containing all the plate barcodes to be added or deleted.<br>The Add Plates file must contain the barcodes in column A, Station ID in column B, index location in column C, and lid status in column D (T = lid present, F = no lid).<br>The Delete Plates file only needs to contain the barcodes.<br>2) Load the file to the Inventory File box<br>3) Select Add Plates or Delete Plates<br>In an Add Plates situation the operator will be asked if the plates are added only to the director or harmonize should occur with the station id<br>In a Delete Plate situation, the operator will be asked if the plates are deleted from director only or both director and driver. Also, a "Delete UnitID" option is displayed. |

The Telios Director may provide the ability to select a unit in the inventory array. This is accomplished by choosing Unit Inventory Control. (Unit Inventory represents all the plates that the system has). This displays the Unit ID, Home Location, Lid status, Trace Array and Unit Information. A scroll box below the "Lid?" status bar scrolls through the selected unit's trace array.

The Telios Director may provide the ability to display the Unit Inventory array. This is accomplished by populating the 'UnitID' in the left control section with the unit of interest. Press the Go to Unit button to populate the Unit Inventory array in the right control section. This shows where the home location is in and below all the trace entries which have been logged for that unit. The trace cluster has several different data types outlining what occurred for that op. Below is the unit information array where data file paths and virtual parameters are associated with units.

The Telios Director may provide the ability update the lid status, trace information, and unit information. The steps to accomplish this are: populate the 'UnitID' in the left control section with the unit of interest; press the Go to Unit button to populate the into the Unit Inventory array in the right control section; and in the left section change the lid status, trace information, and unit information. After populating the appropriate fields, select the button(s) at the top that correspond to the change (UpdateUnitInfoString, UpdateTrace, UpdateLid). Under "Unit Information," FlattenString=associate virtual information in different parts of the array to recall it to use it in different parts of processes and UnitInfoString=associate data to a unit (path to the data that was generated for this particular unit). When a plate is done and a data file should be sent to a different location, steps can be used to recall this piece of information to manipulate.

Figure 18:
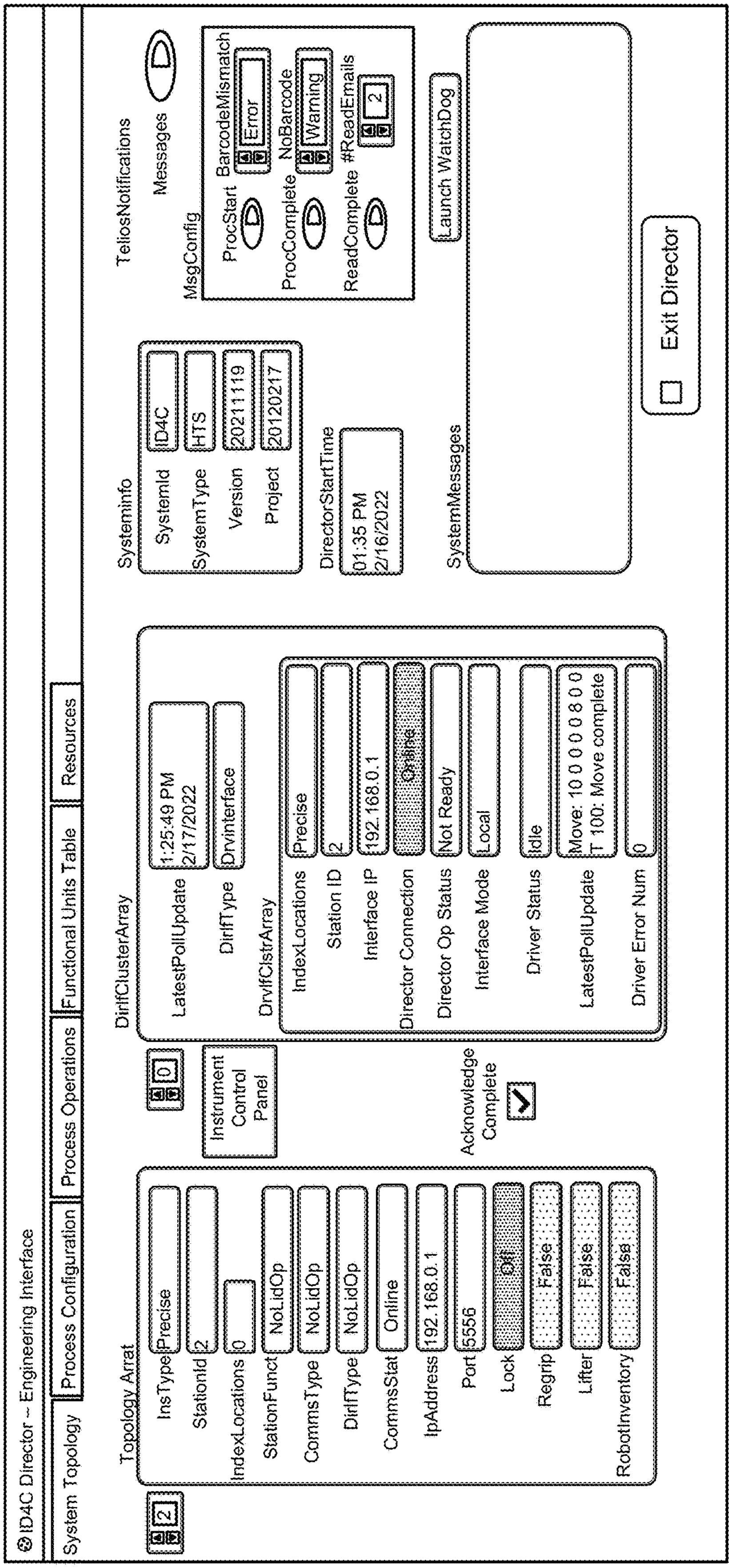
FIG. 18 illustrates an example topology tab of the user interface, according to one embodiment.

In one embodiment, the Telios Director provides the ability to display information about the robotic system and manually control an instrument's driver from the director. This can be implemented through a topology tab, an example of which is shown in FIG. 18. In the embodiment shown, the topology tab includes the following information:

TopologyArray Panel—Users can scroll through the topology array using the top left scroll box to see each instrument integrated on the working director.

DirIfClusterArray Panel—This array allows users to select an instrument in the system topology to display its driver interface cluster.

InstrumentControlPanel Button—Produces a pop-up window of the currently displayed instrument's driver instrument parameters. From this window, the user can control the instrument, sending it the same commands available through the driver.

Acknowledge Complete—Button to free the instrument and allow the director to move on.

SystemInfo Panel—Displays the System Id (name of the system), System Type, Version number of the Director, and the Labview Project ID.

Director Start Time Panel—The time and date the director interface was opened.

Telios Notifications Panel: The Telios Director provides the ability to configure error notifications and the corresponding email distribution list.

System Messages Panel—Displays any system messages from the system.

Exit Director Button—Only active when director is suspended. Produces a user dialog bo1x confirming the shutdown of the director interface.

LaunchWatchDog Button

Figure 19:
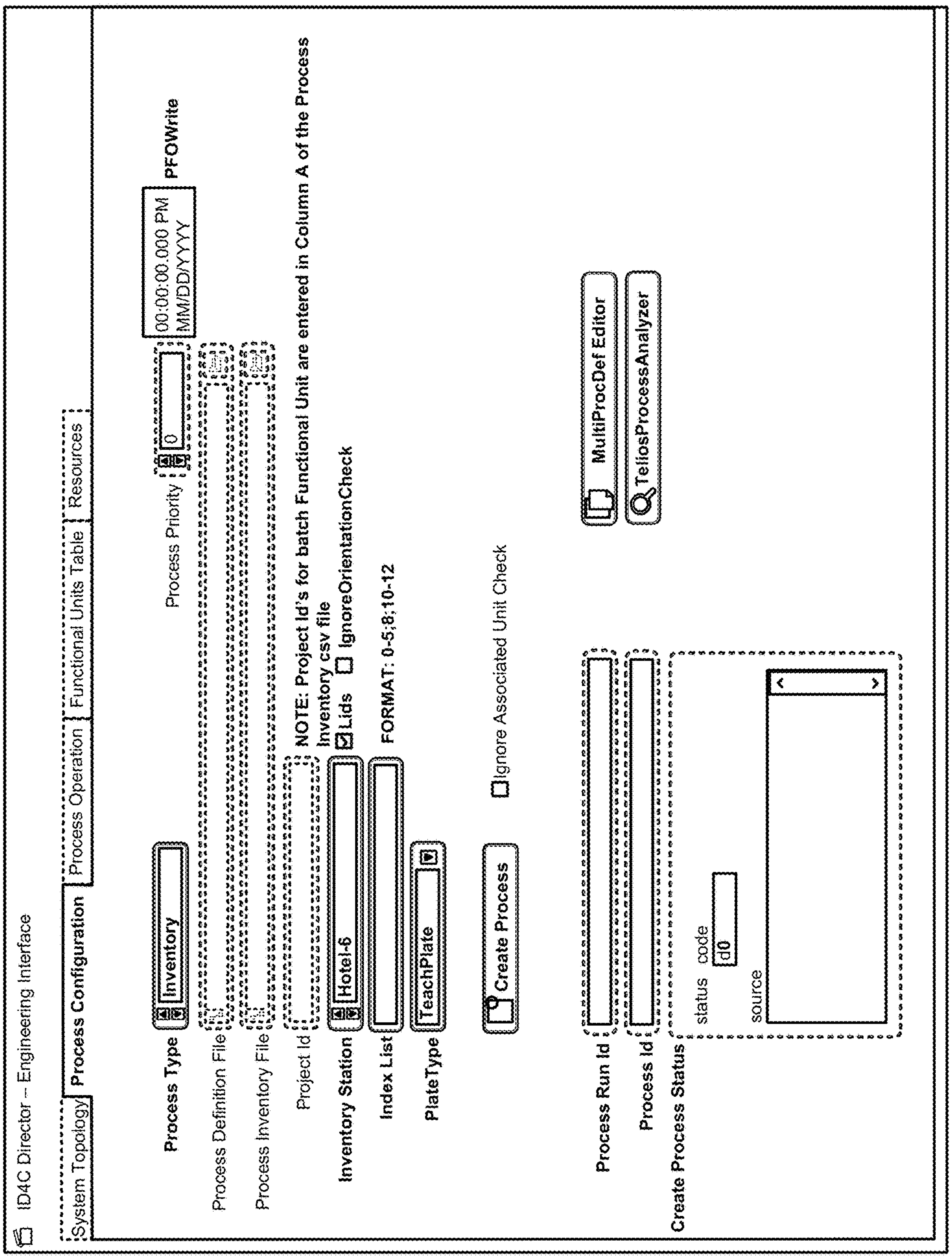
FIG. 19 illustrates an example process configuration tab in the user interface, according to one embodiment.

In one embodiment, the Telios Director provides the ability to load and configure a process through a process configuration tab. FIG. 19 illustrates an example process configuration tab in the user interface, according to one embodiment. In the embodiment shown, the process configuration tab includes the following options:

| Term | Definition |
|---|---|
| Process Type | Standard Process - Allows the user to load one process, which consists of one Process Definition file and one Process Inventory File<br>Multi TPD From File - In the process definition file section, the user would select a MultiProcess (CSV) file, which the user can construct using the MultiProcessDefintionEditor (button is available to start this application on same panel). This allows one inventory file to be run across several TPD files with iterations.<br>Inventory - Performs an inventory. The Inventory Station and Index List sections must be filled out to start.<br>The inventory station is the storage device to inventory<br>The index list contains the positions to inventory.<br>The list can include a single range (i.e., 0-5) or a mix of non-consecutive locations, which must be separated by a semicolon (i.e., 0-5;9;13;16-22).<br>Check the 'Lids' box if units have lids<br>Check the 'IgnoreOrientationCheck' if the orientation of the unit does not matter so odd barcodes are accepted when scanned<br>Choose the Plate Type<br>RestoreProcess - Upon restarting the Director a RestoreProcess can be run, and the director would pick up right where it 'left off'. A "Restore Process Initiated!" dialog is displayed, along with a "Restore" button. |
| Process Definition File | Click on the explore folder button to select the process definition file run. |
| Process Inventory File | Click on the explore folder button to select the process inventory file to run. |
| Project ID | Can be filled out with the PVSID of the process, but this automatically obtained from the process inventory file |
| Process Priority | Can be set to allow the units of a process to obtain resources before another if running multiple processes (0 = lowest; 100 = highest) |
| Create Process | Starts the run |
| Process Run Id and Process Id | Display after "Create Process" button is clicked. Created based on the name of the Process Definition File |
| MultiProcDefEditor button | Displays an application (MultiProcessDefintionEditor) used to configure a Multi TPD File. The file generated is applicable in the Telios Director Process TypeProcDefFolderPath select a folder path where the 'TPD' files reside which will be used.<br>TotalNumberProcDef - specifies the number of ProcDef to be used<br>InitProcDef - pressing this populates the ProcDefArray with all the 'TPD-s' in the chosen directory, which is populated in the ProcDef dropdown. The user sets each entry in the ProcDefArray (TPD selection in dropdown and the number of iterations it should be executed.)<br>MultiProcessFile Table - displays what the resulting configuration is before saving<br>'GenerateMultiProcessCsv' button - will write and save the file (user must specify a name including the '.csv' extension) |

Figure 20:
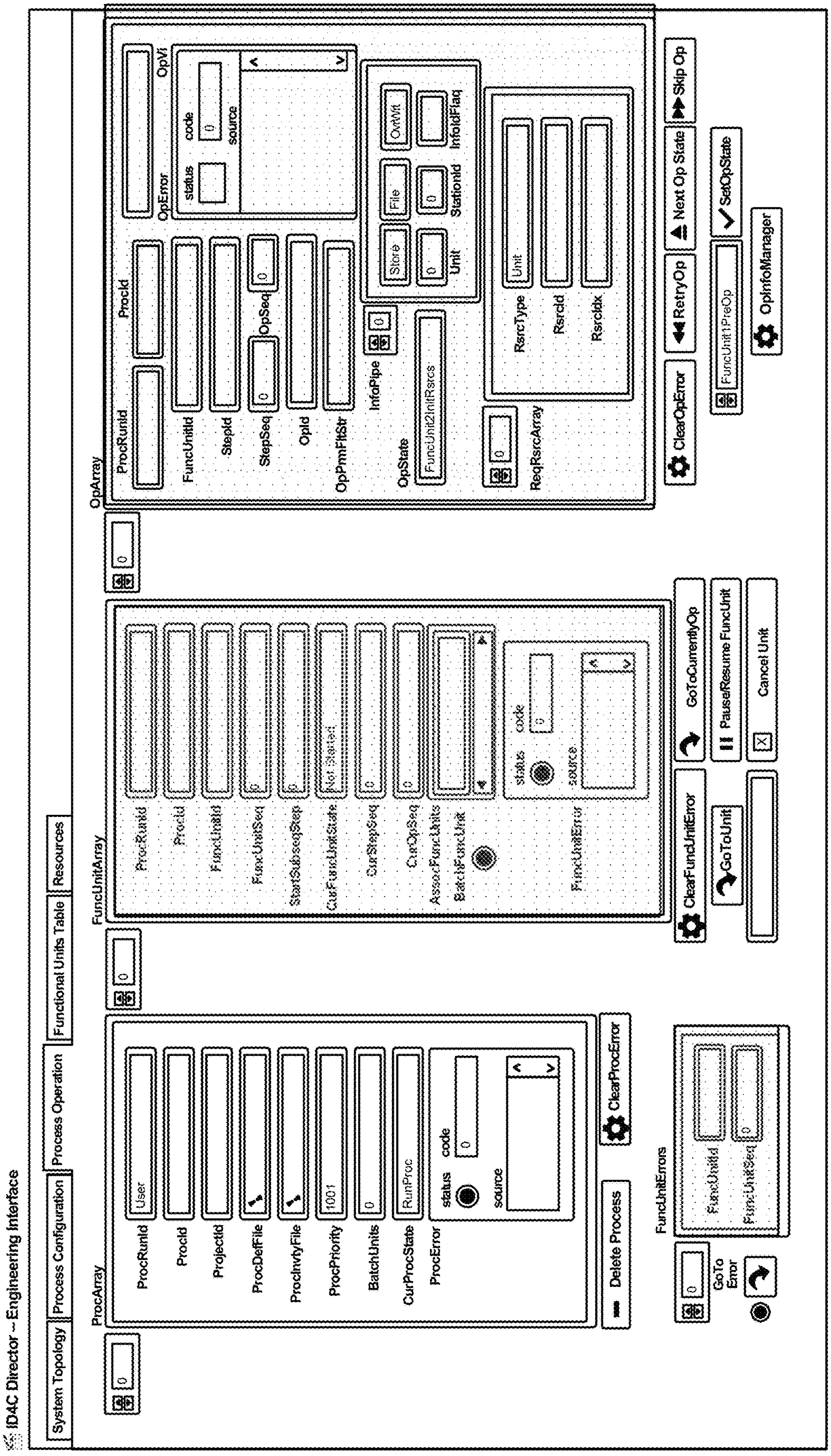
FIG. 20 illustrates an example process operations tab within the user interface, according to one embodiment.

In one embodiment, the Telios Director provides the ability for the operator to observe the running processes using a process operation tab. FIG. 20 illustrates an example process operations tab within the user interface, according to one embodiment. To use any features that alter the process or functional units, the director should first be suspended. When the director is running, these buttons may be greyed out and not accessible. In the embodiment shown in FIG. 20, the process operations tab includes a proc array section that provides an overview of each currently loaded process. Information that may be provided about loaded processes may include:

| CurProcState (indicates what state the process is currently in) | Director Action (Director actions for each current process state) |
|---|---|
| InitStart | Process start. Sets process state to InitProcDef, which reads the TPD file, process inventory file, verifies units exist and creates an Op Array for each barcode. |
| InitInventoryTrace | Makes the initial trace entry in the unit trace array for that unit. |
| RunStart | Gets all functional units and ops, sorts the functional units in numerical order. |
| RunProcess | Keeps checking if the process is finished and checks the state of the func unit. |
| FuncUnits Complete | Creates a run summary and deletes trace entries to save space. |
| Process Complete | Idle. |

The illustrated embodiment of the process operations tab also includes a FuncUnitArray section that displays an overview of each running functional unit. This overview may contain:

| Field | Definition |
|---|---|
| AssocFuncUnits | Lists the barcode of any other functional unit associated with the selected functional unit. |
| BatchFuncUnit | When green, indicates this functional unit is part of a batch. |
| FuncUnitError | Indicates any errors associated with the current functional unit. If light is green, there are no errors. If red, the error and functional unit ID will be displayed in the text box. |
| Go to Current Op | Button that OpArray section with the op currently running for the functional unit presented in the FuncUnitArrays. |
| Go to Unit | Button that allows the user to type in a unit ID and populates the FuncUnitArray with the unit's information. This also populates the OpArray with the unit's current op. |
| Pause/Resume FuncUnit | Button that pauses, or resumes from a pause, the use of a functional unit and all units after it in the functional unit array. This button can only be used when the director is suspended. |
| Cancel FuncUnit | Button that stops the director from using the functional unit currently displayed in the FuncUnitArray. The unit will still appear in the functional unit array and table as "cancelled". This button can only be used when the director is suspended, and the unit should be physically taken off the system before continuing the run.<br>Displays a window with the following fields:<br>Selected Func Unit- cancels only the functional unit that was selected in the FuncUnitArray control.<br>Cancel All from Selected- cancels all units starting with the unit selected in the FuncUnitArray and cancels all subsequent units for that process.<br>Multi Func Unit- allows the user to input which units to cancel from the selected unit's process. The input format can include a range of units (i.e., 1-5) or multiple units separated by a semicolon (i.e., 1-5;7;10). |

The illustrated embodiment of the process operations tab also includes an OpArray section that displays updated details about the operational state for a selected functional unit. The OpArray section may include:

| Field | Definition |
|---|---|
| ProcRunId/ProcId | The process id and process run id associated with the Op |
| OpVi | Displays the Lab VIEW Vi used to run the op |
| FunctionalUnitId | The Id of the Functional unit |
| OpError | Indicates any errors associated with the current op. If light is green, there are no errors. If red, the error and op will be displayed in the text box. |
| StedId | The description of the op(generated by the TPDEditor) |
| StepSeq/OpSeq | The corresponding Step# and Op# for the Op |
| OpId | The director uses this field occasionally for specialized driver coms |

-continued

| Field | Definition |
|---|---|
| InfoPipe | Contains the directions on whether a file or virtual information is to be recalled or saved for an op, also specified is the unit index and any specific flags on what files or information should be gathered from an array scenario |
| OpState **1 | There are multiple OpStates for each step. Getting to know the state the director is in during each OpState will aid in error recovery. At the start of each op, the director will first check the needed resources in the FuncUnit1PreOps, FuncUnit2 and OpStates. It then communicates with the director in OpStates 1-7. |
| OpPrmFltStr | A flattened string of operating parameters specified in the TPD and .ini for the station. |
| ReqRsrcArray | Allows user to scroll through the resource array for the selected op. Use the left scroll box to choose a resource index.<br>RsrcType- type of resource (i.e unit or station).<br>RsrcId- either unitId or station number.<br>RsrcIdx- the resource index in the resource array. |

In one embodiment, the OpState parameter can take the following values:

| OpState | Director Action |
|---|---|
| FuncUnit1 PreOps | Determines what resources are needed and requests to acquire these resources. |
| FuncUnit2 | Requests resources and displays a "waiting for resources" status in the Functional Units Table while allocations are made. Creates trace file entries when resources are obtained. |
| OpState1 | Updates functional unit info. Checks that the requested director is online and ready. |
| OpState2 | Similar to OpState1 |
| OpState3 | Starts the op |
| OpState4 | Waits for the driver's status to change to complete. |
| OpState5 | Acknowledges complete (changes the driver's status from complete to ready). Reads back the drvintf cluster file path (data file path) and any driver indicators. This op state should not be skipped if the step is reading a plate, as this obtains the data file. |
| OpState6 | Verifies the driver is ready. |
| OpState7 | Gets next op (of one exists). Transfers resources to next op if it contains any resources used in the current op. |
| FuncUnit3 Post Op | Op is deleted from op array. |

Figure 21:
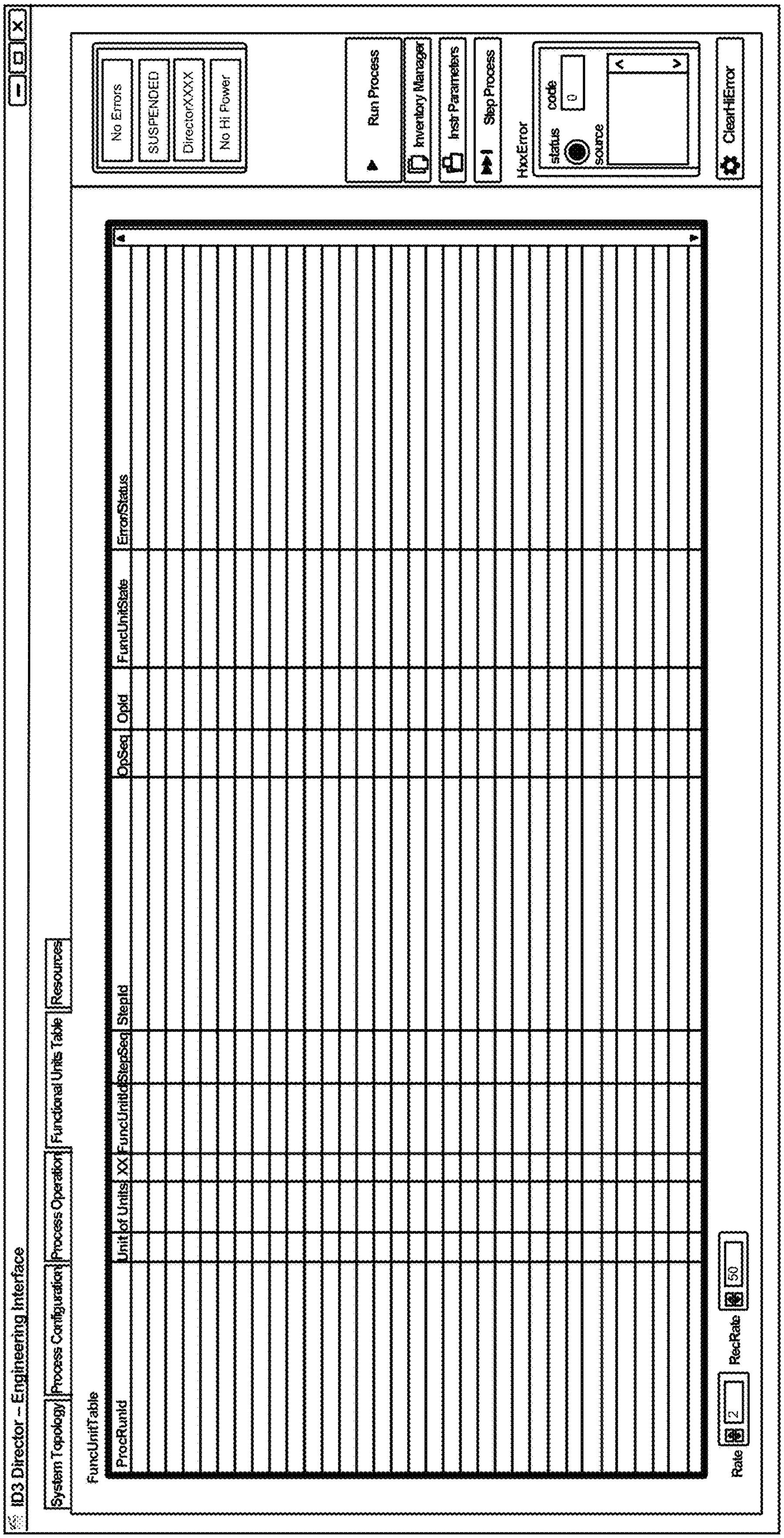
FIG. 21 illustrates an example FunctionalUnits Table tab in the user interface, according to one embodiment.

In one embodiment, the Telios Director provides the ability to display the functional units and their status when a process is running in a FunctionalUnits table tab. FIG. 21 illustrates an example FunctionalUnits Table tab in the user interface, according to one embodiment. The FunctionalUnits Table tab may include some or all of the following information about one or more functional units:

| Column | Description |
|---|---|
| ProcRunId | The name of the process running, taken from the name of the Process Definition File. |
| Unit | The unit number for the individual functional unit in an overall process. This numbering starts at 1. |
| Number of Units | Total number of units in the process. |
| Idx | The unit's index in the functional unit array. This is zero based. |
| FuncUnitId | The ID or barcode of the functional unit. |
| StepSeq | The step of the process the functional unit is currently on. |
| StepId | A description of the step. |
| OpSeq | The current op sequence (zero based) running for the current StepSeq. |
| OpId | For Director use only. |
| FuncUnitState | Describes the state of the functional relative to the StepSeq.<br>a. Not Started- the step displayed has not yet started<br>b. Running- the FuncUnit is running<br>c. Complete- the FuncUnit is complete.<br>d. Cancelled - the FuncUnit was cancelled |
| Error/Status | Contains any error or status messages. If the unit is incubating, this section will report the time and date when the incubation will end. |

Figure 22:
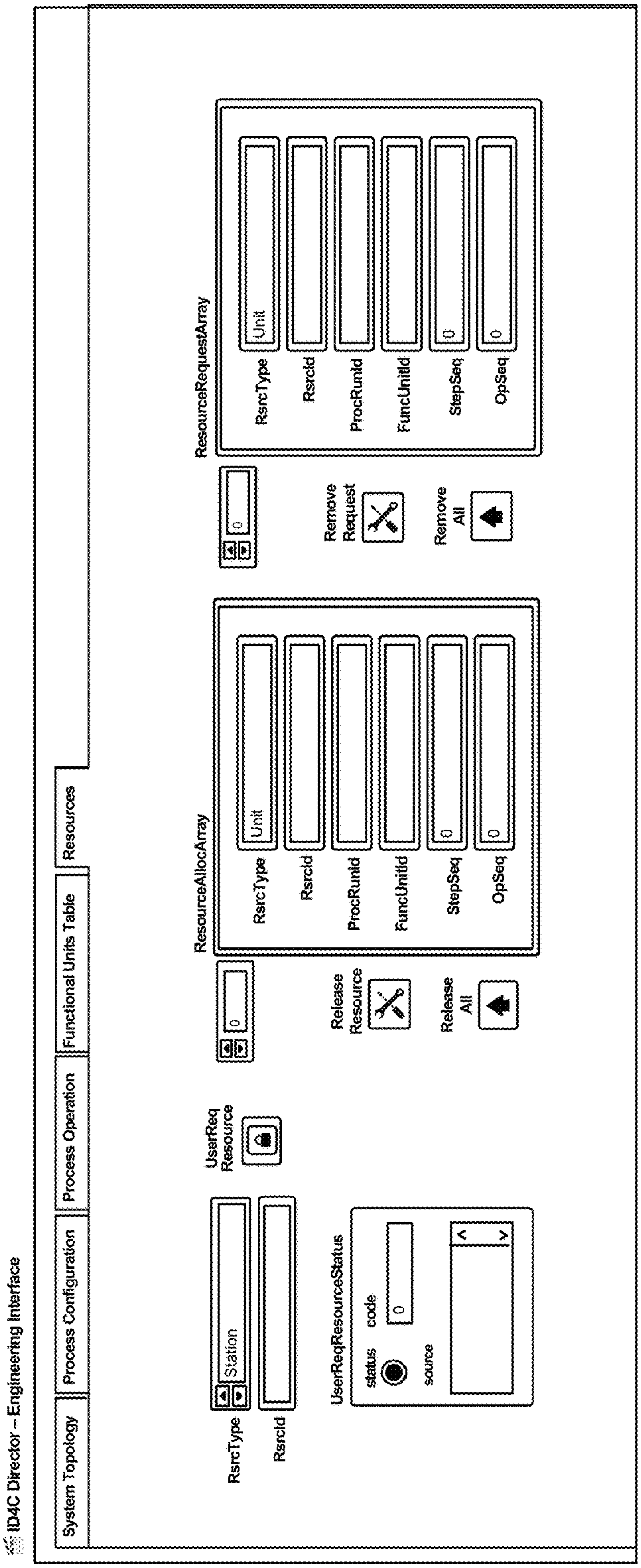
FIG. 22 illustrates an example Resources tab in the user interface, according to one embodiment.
Figure 23:
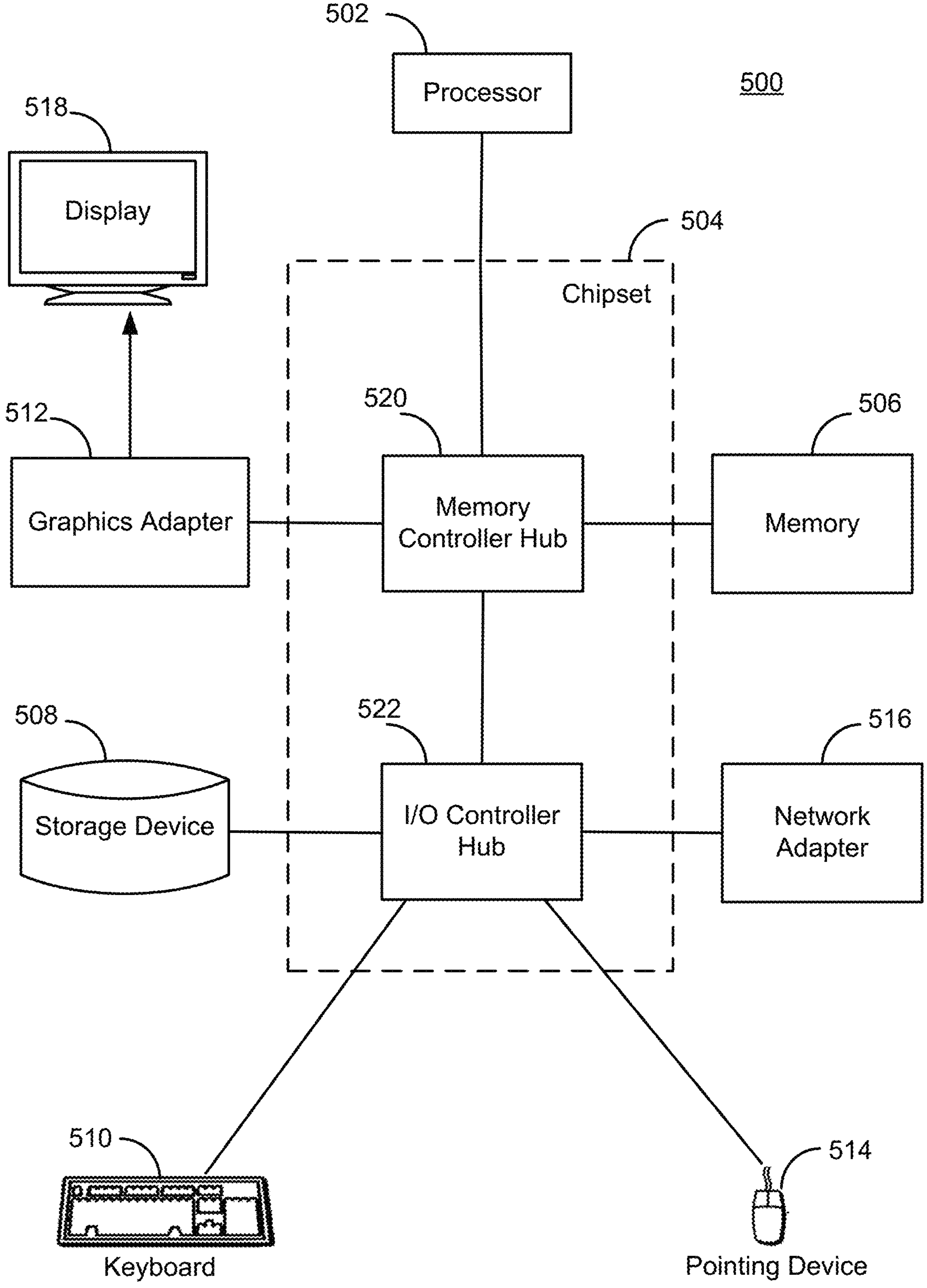
FIG. 23 is a block diagram illustrating an example of a computer suitable for use in the networked computing environment of FIG. 1, according to one embodiment.

In one embodiment, the Telios Director provides the ability to remove or release resources in a Resources tab. FIG. 22 illustrates an example Resources tab in the user interface, according to one embodiment. The Resources tab may include some or all of the following options for managing resources:

| Operation | Steps |
|---|---|
| To release a resource | Select value for "Rsrc Type"<br>Enter Rsrc Id<br>Select an index value for "ResourceAllocArray"<br>Click "Release Resource" |
| To remove a resource | Select value for "Rsrc Type'<br>Enter Rsrc Id<br>Click "UserReq Resource"<br>Select an index value for "ResourceAllocArray"<br>Click "Remove Request" |
| "Release All" button | Releases All Resources |
| "Remove All" button | Removes All Resources |

In one embodiment, the Telios Director provides the ability to clear errors and skip states. This functionality may be provided by buttons in the user interface. These buttons should be used only when the system is ready to continue running after an error has been manually recovered (such as a crash). Examples of such buttons include:

In one embodiment, the Telios Director provides the ability to shutdown the system. First the system is suspended, and then "Exit" is selected from the System Topology tab. The Director updates the TeliosSystemInventory.csv file with the most current inventory when shutdown. If this file is open when shutting down, the Director will remain open and send an error message to close the file before continuing. The instruments drivers can also be closed and the instruments shutdown, if desired.

Example Use Case

Appendix A, which makes up a part of this disclosure and specification, includes additional details of an example use case of Telios, according to one embodiment. Note that Appendix A describes specific embodiments by way of example only. Any feature that is described as important, critical, essential, or otherwise required should be considered to only be required in that embodiment. Other embodiments may not include such elements.

Computing System Architecture

FIG. 22 is a block diagram of an example computer 500 suitable for use as a workstation 110. The example computer 500 includes at least one processor 502 coupled to a chipset

| Button | Function |
|---|---|
| ClearProcError | Clears process array errors |
| FuncUnitErrors | Users can use the scroll box to choose a functional unit. The area will be greyed out if the functional unit does not have an error. A functional unit with an error will populate the area with its FuncUnitID and FuncUnitSeq. |
| Go to Error | Can be clicked, if the indicator next to it is red, to populate the error message and FuncUnit in the Functional Unit Array and the func units current op in the Op Array |
| ClearFuncUnitError | Clears the functional unit error for the selected func unit |
| ClearOpError | Clears the op array error for the currently selected op |
| Retry Op | The director must be suspended to use. Retries the op (sets the op state back to op state 1) that is currently displayed in the OpArray section. |
| Next Op State | The director must be suspended to use. Increments the op state by 1 displayed in the OpArray section and starts the subsequent op state. |
| Skip Op | The director must be suspended to use. Sets the OpState to OpState 7 in the OpArray section for the selected op bypassing all op steps. |
| Set Op State | The director must be suspended to use. Sets the op state of the op selected in the OpArray to a user defined choice from the drop-down menu. This option should only be used by users familiar with op states and this function. |
| OpInfoManager (Process Operation Tab) | Change the contents of an op while a process is running. This can correct program errors which were not noticed during their validation. Specific Directions are provided on the OpInfoManager panel. The operator can target a specific op and modify that for a selected series of units contained in that process<br>The operator starts by providing a ProcRunId and hitting 'GetProcessOps'. This will load the functional units and operations into the FuncUnitTable, and also load the TPD into the TpdOpArray to reference the complete TPD.<br>Loaded Process will populate and the time at which this was loaded.<br>The path of the loaded TPD will also be presented.<br>At this point the operator can scroll thru the OpInforArray and pick the representative Op.<br>PopulateOpInfo will move that op into OpInfo window,<br>The following fields may be modified : StepId, OpId, OpPrmFltStr, InfoPipe, OpVi.<br>To modify the OpPrmFltStr , the operator hits the ViewOpInfoParm - this will open the stations Parm window allowing modification.<br>The operator then populates the FuncUnitsForModification array with the target func units for the op modification.<br>The operator presses ReplaceOp |

504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

In the embodiment shown in FIG. 5, the storage device 508 is a non-transitory computer-readable storage medium such as a hard drive, compact disk read-only memory (CD-ROM), DVD, or a solid-state memory device. The memory 506 holds instructions and data used by the processor 502. The pointing device 514 is a mouse, track ball, touch-screen, or other type of pointing device, and may be used in combination with the keyboard 510 (which may be an on-screen keyboard) to input data into the computer system 500. The graphics adapter 512 displays images and other information on the display 518. The network adapter 516 couples the computer system 500 to one or more computer networks.

The types of computers used by the entities within the networked computing environment 100 can vary depending upon the embodiment and the processing power required by the entity. Furthermore, the computers can lack some of the components described above, such as keyboards 510, graphics adapters 512, and displays 518.

Additional Considerations

Some portions of above description describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise.

Where values are described as "approximate" or "substantially" (or their derivatives), such values should be construed as accurate +/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs. Thus, while particular embodiments and applications have been illustrated and described, it is to be understood that the described subject matter is not limited to the precise construction and components disclosed. The scope of protection should be limited only by any claims that ultimately issue.

What is claimed is:

1. A networked computing environment comprising:
a plurality of instruments;
a robot configured to transfer a sample between different ones on the plurality of instruments; and
a computing device configured to;
convert instructions for controlling the plurality of instruments and the robot from a standardized instruction format to a plurality of instrument/robot-specific formats, each of the instrument/robot-specific formats corresponding to one of the plurality of instruments or the robot, wherein the computing device converts the instructions using a set of drivers, each driver in the set of drivers configured to convert instructions in the standardized format into one of the instrument/robot-specific formats used by a corresponding one of the plurality of instruments or the robot;
control, via communications sent over a network and using the instructions in the standardized instruction format, operation of the plurality of instruments and the robot to generate test results for the sample; and
provide a user interface via which a user can define a new driver for a new type of instrument or robot, the new driver defining mappings between instructions in the standardized format and instructions in a native protocol or language used by the new type of instrument or robot.

2. The networked computing environment of claim 1, wherein the computing device is further configured to receive data from at least a subset of the plurality of instruments and aggregate the data into a standardized data format to generate the test results.

3. The networked computing environment of claim 1, further comprising one or more additional robots, the one or more additional robots being controlled by instructions in a different format than the robot, wherein the computing device is further configured to convert instructions for the one or more additional robots from the standardized format to the different format.

4. The networked computing environment of claim 1, wherein the computing device is further configured to provide a verifiable audit trail for generation of the test results.

5. The networked computing environment of claim 4, wherein the computing device being configured to provide the verifiable audit trail comprises the computing device being configured to:
verify a user responsible for generation of the test results using a set of credentials of the user; and
store an identifier of the user in conjunction with the instructions in the standardized format and the test results.

6. The networked computing environment of claim 5, wherein at least one of a timestamp, an instrument identifier, a plate identifier, or a step number are also stored in conjunction with the identifier of the user.

7. The networked computing environment of claim 1, wherein the computing device is further configured to maintain an inventory of plates, with each plate being identified by a barcode listed in a process inventory file.

8. The networked computing environment of claim 1, wherein the computing device is further configured to cause automatic transfer of raw instrument data generated by a first instrument of the plurality of instruments to a secure network drive.

9. A computer-implemented method for controlling a robot and a plurality of instruments, the method comprising:

obtaining a set of instructions for the robot and plurality of instruments in a standardized instruction format;

converting the set of instructions into a plurality of instrument/robot-specific formats, wherein each of the instrument/robot-specific formats corresponds to one of the plurality of instruments or the robot, wherein converting the set of instructions into the plurality of instrument/robot-specific formats comprises:

obtaining a set of drivers, each driver of the set of drivers configured to convert instructions in the standardized format into one of the instrument/robot-specific formats used by a corresponding one of the plurality of instruments or the robot; and converting the set of instructions into the plurality of instrument/robot-specific formats using the set of drivers;

providing the instructions in the instrument/robot-specific formats to the corresponding one of the plurality of instruments or robots, wherein, responsive to the instructions, the robot moves a sample between the plurality of instruments in a specified order to generate test results;

providing a user interface via which a user can define a new driver for a new type of instrument or robot;

receiving, via the user interface, mappings between instructions in the standardized format and instructions in a native protocol or language used by the new type of instrument or robot; and creating the new driver using the mappings.

10. The method of claim 9, further comprising:

receiving data from at least a subset of the plurality of instruments that was generated in response to the instructions; and aggregating the data into a standardized data format to generate the test results.

11. The method of claim 9, further comprising:

obtaining instructions for one or more additional robots in the standardized format; and converting the instructions for the one or more additional robots from the standardized format to a different robot-specific format.

12. The method of claim 9, further comprising generating a verifiable audit trail for generation of the test results by:

verifying a user responsible for generation of the test results using a set of credentials of the user; and storing an identifier of the user in conjunction with the instructions in the standardized format and the test results.

13. The method of claim 9, further comprising maintaining an inventory of plates, wherein each plate is identified by a barcode listed in a process inventory file.

14. The method of claim 9, further comprising causing automatic transfer of raw instrument data generated by a first instrument of the plurality of instruments to a secure network drive.

15. A non-transitory computer-readable medium comprising computer program code for controlling a robot and a plurality of instruments, the computer program code, when executed by a computing system, causing the computing system to:

obtain a set of instructions for the robot and plurality of instruments in a standardized instruction format;

convert the set of instructions into a plurality of instrument/robot-specific formats, wherein each of the instrument/robot-specific formats corresponds to one of the plurality of instruments or the robot, wherein the instructions that cause the computing system to convert the set of instructions onto the plurality of instrument/robot-specific formats comprise instructions that cause the computing system to:

obtain a set of drivers, each driver of the set of drivers configured to convert instructions in the standardized format into one of the instrument/robot-specific formats used by a corresponding one of the plurality of instruments or the robot; and convert the set of instructions into the plurality of instrument/robot-specific formats using the set of drivers;

provide the instructions in the instrument/robot-specific formats to the corresponding one of the plurality of instruments or robots, wherein, responsive to the instructions, the robot moves a sample between the plurality of instruments in a specified order to generate test results;

provide a user interface via which a user can define a new driver for a new type of instrument or robot;

receive, via the user interface, mappings between instructions in the standardized format and instructions in a native protocol or language used by the new type of instrument or robot; and create the new driver using the mappings.

16. The non-transitory computer-readable medium of claim 15, wherein the computer program code further causes the computing system to generate a verifiable audit trail for generation of the test results by:

verifying a user responsible for generation of the test results using a set of credentials of the user; and storing an identifier of the user in conjunction with the instructions in the standardized format and the test results.

17. The non-transitory computer-readable medium of claim 15, wherein the computer program code further causes the computing system to:

receive data from at least a subset of the plurality of instruments that was generated in response to the instructions; and aggregate the data into a standardized data format to generate the test results.

18. The non-transitory computer-readable medium of claim 15, wherein the computer program code further causes the computing system to:

obtain instructions for one or more additional robots in the standardized format; and converting the instructions for the one or more additional robots from the standardized format to a different robot-specific format.

19. The non-transitory computer-readable medium of claim 15, wherein the computer program code further causes the computing system to maintain an inventory of plates, wherein each plate is identified by a barcode listed in a process inventory file.

20. The non-transitory computer-readable medium of claim 15, wherein the computer program code further causes the computing system to cause automatic transfer of raw instrument data generated by a first instrument of the plurality of instruments to a secure network drive.

* * * * *